(12) United States Patent
Davis

(10) Patent No.: US 8,796,881 B2
(45) Date of Patent: Aug. 5, 2014

(54) ELECTRIC VEHICLE POWER MANAGEMENT SYSTEMS

(71) Applicant: GridPoint, Inc., Arlington, VA (US)

(72) Inventor: Jeremy Davis, Seattle, WA (US)

(73) Assignee: GridPoint, Inc., Arlington, VA (US)

( * ) Notice: Subject to any disclaimer, the term of this patent is extended or adjusted under 35 U.S.C. 154(b) by 0 days.

(21) Appl. No.: 13/671,717

(22) Filed: Nov. 8, 2012

(65) Prior Publication Data

US 2013/0217409 A1 Aug. 22, 2013

Related U.S. Application Data

(63) Continuation of application No. 12/751,853, filed on Mar. 31, 2010, now abandoned, and a continuation of application No. 12/751,837, filed on Mar. 31, 2010, now abandoned, and a continuation of application No. 12/751,821, filed on Mar. 31, 2010, now abandoned, and a continuation of application No. 12/751,845, filed on Mar. 31, 2010, now abandoned, and a continuation of application No. 12/751,862, filed on Mar. 31, 2010, now abandoned, and a continuation of application No. 12/751,852, filed on Mar. 31, 2010.

(60) Provisional application No. 61/165,344, filed on Mar. 31, 2009.

(51) Int. Cl.
*H02J 1/00* (2006.01)

(52) U.S. Cl.
USPC ............................................. 307/69; 307/9.1

(58) Field of Classification Search
USPC ..................................................... 307/69, 9.1
See application file for complete search history.

*Primary Examiner* — Robert L. Deberadinis
(74) *Attorney, Agent, or Firm* — Greenberg Traurig LLP

(57) ABSTRACT

A system that enables power flow management for electrical devices, such as electric vehicles. Power flow managers can coordinate charging activities. Power flow decisions may be based on site-level information. Power flow management strategies may be optimized. Power spikes may be avoided by using safe failure modes. Generation stacks may be used for reducing cost. AGC commands are used to control power resources. Power regulation are apportioned to power resources, and power regulation ranges may be determined. Power flow strategies are implemented in response to changes in intermittent power flow. Locations of devices may be determined using network fingerprints. Power flow measurements are determined, and AC power flows are inferred from DC power flows. Network traffic consumption are minimized. Communication protocols are translated. Enhanced vehicle communications are provided that communicate to vehicle subsystems, that arbitrate smart charge points, and that use existing hardware, non-specific hardware, or control extensibility systems.

10 Claims, 26 Drawing Sheets

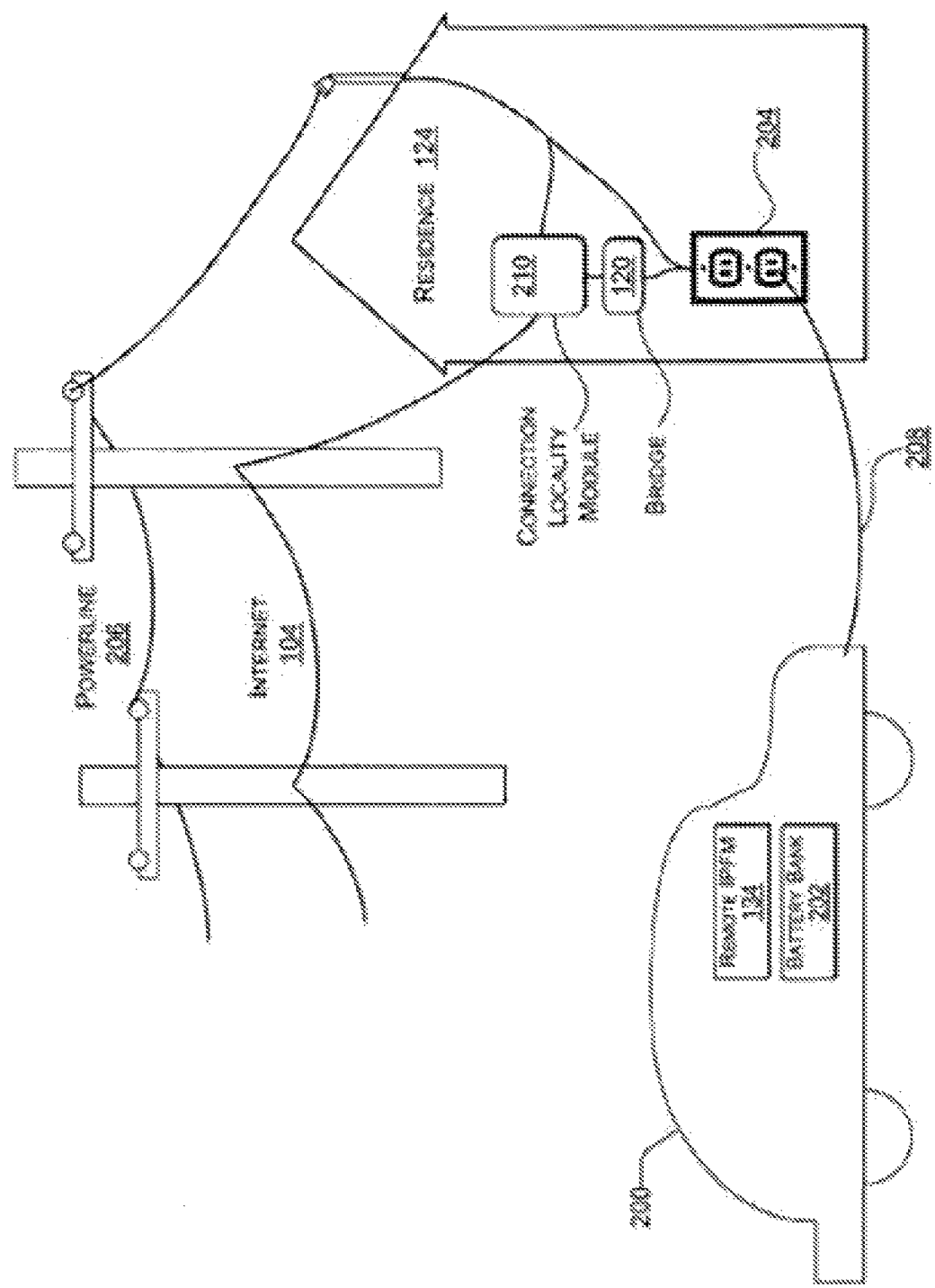

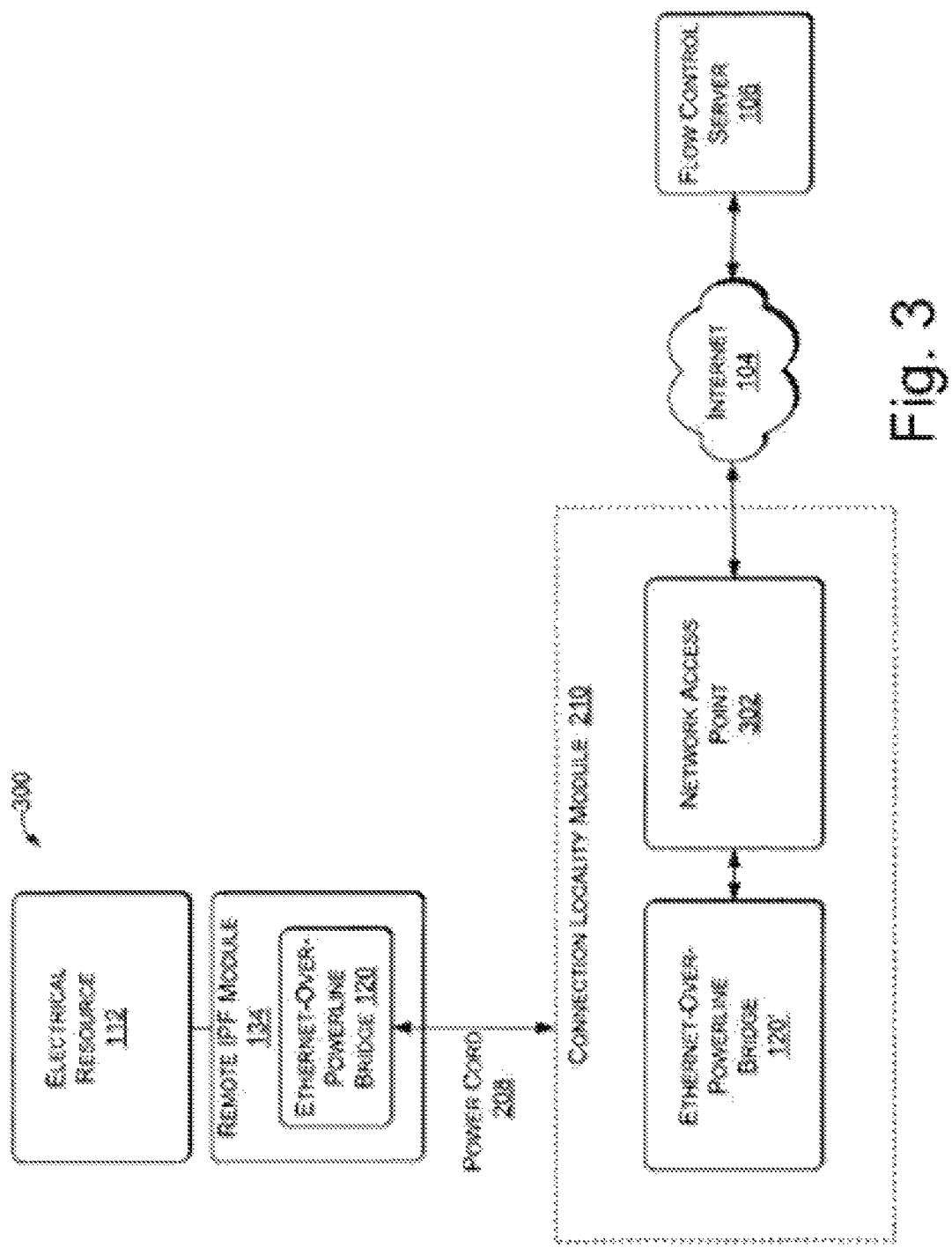

ELECTRIC VEHICLE POWER MANAGEMENT SYSTEMS

This patent application is a continuation of, and incorporates herein by reference, each of the following applications: U.S. patent application Ser. No. 12/751,853 filed Mar. 31, 2010, now abandoned, U.S. patent application Ser. No. 12/751,837 filed Mar. 31, 2010, now abandoned, U.S. patent application Ser. No. 12/751,821 filed Mar. 31, 2010, now abandoned U.S. patent application Ser. No. 12/751,845 filed Mar. 31, 2010, now issued U.S. patent application Ser. No. 12/751,862 filed Mar. 31, 2010, now abandoned and U.S. patent application Ser. No. 12/751,852 filed Mar. 31, 2010, which each claim priority to U.S. Provisional Patent Application No. 61/165,344 filed on Mar. 31, 2009. This application also incorporates herein by reference the following: U.S. patent application Ser. No. 12/252,657 filed Oct. 16, 2008; now abandoned U.S. patent application Ser. No. 12/252,209 filed Oct. 15, 2008; now abandoned, U.S. patent application Ser. No. 12/252,803 filed Oct. 16, 2008; now abandoned, and U.S. patent application Ser. No. 12/252,950 filed Oct. 16, 2008, now abandoned.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of electric vehicles, and in particular to novel systems and methods for power flow management for electric vehicles.

BACKGROUND OF THE INVENTION

Low-level electrical and communication interfaces to enable charging and discharging of electric vehicles with respect to the grid is described in U.S. Pat. No. 5,642,270 to Green et al., entitled, "Battery powered electric vehicle and electrical supply system," incorporated herein by reference. The Green reference describes a bi-directional charging and communication system for grid-connected electric vehicles.

Communication parameters can be used to infer a remote machine's operating system fingerprint. For example, in an IP over Ethernet based system there are several layers of message framing all with unique or semi unique characteristics. The MAC address of the gateway, the number of network peers and their addresses can all be determined by watching existing network traffic, or by soliciting such information of the network peers themselves. Techniques like port scanning are in wide use for determining network topology. Several techniques exist for determining the host operating systems of network peers using IP stack fingerprinting.

Modern automobiles, including electric vehicles, have many electronic control units for various subsystems. While some subsystems are independent, communications among others are essential. To fill this need, controller-area network (CAN or CAN-bus) was devised as a multi-master broadcast serial bus standard for connecting electronic control units. Using a message based protocol designed specifically for automotive applications, CAN-bus is a vehicle bus standard designed to allow microcontrollers and devices to communicate with each other within a vehicle without a host computer. The CAN-bus is used in vehicles to connect the engine control unit, transmission, airbags, antilock braking, cruise control, audio systems, windows, doors, mirror adjustment, climate control, and seat control. CAN is one of five protocols used in the (On-Board Diagnostics) OBD-II vehicle diagnostics standard.

Modern vehicles contain a variety of subsystems that may benefit from communications with various off-vehicle entities. As the smart energy marketplace evolves, multiple application-level protocols may further develop for the control of power flow for electric vehicles and within the home. For example, energy management protocols are being developed for both ZigBee and Homeplug. A vehicle manufacturer may need to support multiple physical communications mediums. For example, ZigBee is used in some installations while PLC is used in others. Considering the very long service life of items such as utility meters and automobiles, the use of multiple incompatible protocols may pose an barrier to deployment. For example, if a homeowner buys a car that utilizes one protocol and receives a utility meter that uses another protocol, it is unlikely that either device will quickly replace other device.

The electric power grid has become increasingly unreliable and antiquated, as evidenced by frequent large-scale power outages. Grid instability wastes energy, both directly and indirectly, e.g. by encouraging power consumers to install inefficient forms of backup generation. While clean forms of energy generation, such as wind and solar, can help to address the above problems, they suffer from intermittency. Hence, grid operators are reluctant to rely heavily on these sources, making it difficult to move away from carbon-intensive forms of electricity.

With respect to the electric power grid, electric power delivered during periods of peak demand costs substantially more than off-peak power. The electric power grid contains limited inherent facility for storing electrical energy. Electricity must be generated constantly to meet uncertain demand, which often results in over-generation (and hence wasted energy) and sometimes results in under-generation (and hence power failures). Distributed electric resources, en masse can, in principle, provide a significant resource for addressing the above problems. However, current power services infrastructure lacks provisioning and flexibility that are required for aggregating a large number of small-scale resources, such as electric vehicle batteries, to meet large-scale needs of power services.

The communications protocol by which an utility controls a power plant in regulation mode is known as Automatic Generation Control, or AGC. AGC signals have been sent to large scale conventional power plants, generally with a capacity of 1 Megawatt or more.

Modern Electric vehicles could benefit in a variety of ways from a centrally controlled smart charging program, wherein a central server coordinates the charging activities of a number of vehicles. Significant opportunities for improvement exist in managing power flow at local level. More economical, reliable electrical power needs to be provided at times of peak demand. Power services, such as regulation and spinning reserves, can be provided to electricity markets to provide a significant economic opportunity. Technologies can be enabled to provide broader use of intermittent power sources, such as wind and solar.

What is needed are power flow management systems and methods that manage power flow at the site-level, that implement various power flow strategies for the optimizing how to dispatch the resources under management, that avoid power spikes, and that minimize the total daily cost of providing energy generation. Novel grid stabilization systems and methods are needed that aggregate the power generation behavior of resources via Automatic Generation Control (AGC), that provide system frequency regulation via AGC, and that smooth and level power generation.

While various other techniques for fingerprinting devices on a network are known in the art, novel methods are needed to determine the network location of mobile devices connected to a power grid in order to provide enhanced techniques for smart charging. Significant opportunities for improvement exist with respect to locating electric vehicles on a network that communications with power grids and various mobile devices. What is needed are systems and methods that determine the location of a device with respect to a known location on the electrical grid. With respect to the statistical nature of the fingerprint, there is also a need for novel statistical modeling that weighs the relevance of various pieces of communication based information collected to construct a network fingerprint. In particular, novel systems and methods are needed that efficiently determine the network location of mobile devices on networks for power management systems.

Significant opportunities for improvement exist with respect to metering and translating measurements for power grids and electric vehicles. What is needed are systems and methods that provide for the efficient transfer of higher levels of information dealing with mobile populations of electric vehicles, the complexities of accurately metering such large populations.

Improvement also exist with respect to communications between power grids and electric vehicles. What is needed are systems and methods that provide for the complexity of translating information among various protocols. In addition to cost of translating messages, there is a cost associated with transmitting messages across networks. As such, there is also a need for novel communication techniques that provide for bandwidth minimization.

It would be beneficial to enhance modern electric vehicles to have a centrally controlled charging program. What is needed are systems and methods that provide for the complexity of charging intelligence of smart vehicles. There is also a need for novel communication techniques effectively use existing communication hardware, that allow for upgrading existing equipment, and that do not require specific hardware. In addition, novel systems and methods are needed that effectively provide communication services to vehicle subsystems.

SUMMARY OF THE INVENTION

In an embodiment, a method for managing power flow at a local site includes site-level charging of electrical devices by a power flow manager. The power flow manager runs a smart charging program, and coordinates charging activities of the electrical devices. The electrical devices may be located at the local site. The method includes receiving site-level information, which is received by the power flow manager. In addition, power flow decisions are made, by the power flow manager, based on the site-level information. Further, power flow to the electrical devices is managed by the power flow manager, wherein the power flow manager responds to requests.

In another embodiment, a method for managing power flow by optimizing multiple power flow management strategies includes coordinating charging activities of electrical devices. The charge activities are coordinated by a power flow manager. Power flow services are also controlled by the power flow manager. A power flow management strategy is chosen by a meta-optimizer, which also chooses the electrical devices to utilize for implementing the power flow management strategy. The power flow management strategies are implemented by the power flow manager.

In one embodiment, a method for managing power flow using safe failure modes includes coordinating charging activities of electrical devices by a power flow manager. The method includes detecting a system failure event by a power flow manager, and implementing a safe failure mode. The safe failure mode implemented by the power flow manager provides that the charging activities be coordinated in a predictable and non-disruptive manner.

In another embodiment, a method for managing power flow uses generation stacks of power production to reduce cost of providing power to electrical devices. This method also includes coordinating charging activities of electrical devices by a power flow manager. In addition, the power flow manager controls a power production stack, which orders available power. A dispatchable load is listed in the power production stack. The dispatchable load is removed based on a cost reduction strategy.

In an embodiment, a method for managing power flow includes controlling power resources via Automatic Generation Control (AGC) commands. The AGC commands are transmitted by a power flow manager to the power resources. The AGC commands request power regulation. The method includes apportioning the power regulation to the power resources based on an apportionment scheme. In addition, the method may include transmitting an AGC command to a power resource, wherein the AGC command requests an apportioned amount of the power regulation from the power resource.

The apportionment scheme may relate to various factors, including: power range of each power resource; power range of some power resources; minimization of communications to the power resources; fairness to the power resources; maximization future abilities to provide power services by the power resources; and/or, preferences or requirements of the power resources.

In another embodiment, the method for managing power flow also includes controlling a plurality of power resources via Automatic Generation Control (AGC) commands. The AGC commands are transmitted by a power flow manager to power resources, and the AGC commands request power regulation. Further, the method determines a power regulation range for a power resource, and transmits an AGC command to the power resource. The AGC command is based on the power regulation range for the power resource.

In yet another embodiment, a method for managing power flow may include detecting a change in an intermittent power flow. Accordingly, a power flow manager detects the change in the intermittent power flow. The power flow manager also coordinates power resources to respond to the change in the intermittent power flow by implementing a power flow strategy. The power flow strategy may be a smoothing strategy or a leveling strategy.

In an embodiment, a method for determining the location of devices on power flow management system using network fingerprints includes receiving network information. Such network information is associated with electric devices, such as electric vehicles. The method includes generating a network fingerprint based on the network information, and storing the network fingerprint in a database. Further, the method includes detecting a change in device information for an electric devices. The changed device information of the electric devices is compared with the network fingerprint. The location of the electric device is determined based on the network fingerprint.

In one embodiment the invention is a method. A plurality of power flow measurements are received from each of a plurality of devices. Each device is associated with a power flow and is capable of measuring the respective device's power flow within a measurement error. The plurality of power flow measurements are aggregated, using a computing device, producing an aggregated power flow measurement. The error bounds of the aggregated power flow measurement are then determined, using the computing device, using at least one error model.

In another embodiment the invention is a system. The system comprises: a plurality of devices, each device being associated with a power flow, each of the devices being capable of measuring the respective device's power flow within a measurement error; an aggregate power measurement module comprising one or more processors programmed to execute software code retrieved from a computer readable storage medium storing software for a method. The method comprises the steps of receiving, over a network, a plurality of power flow measurements from each of the plurality of devices; aggregating the power flow measurements, producing an aggregated power flow measurement; and determining the error bounds of the aggregated power flow measurement using at least one error model.

In another embodiment, the invention is a method. A device having at least one DC power flow sensor is augmented with at least one AC power flow sensor and AC and DC power flows through the device are measured using the sensors over a range of operating points. An inference model of AC power flow in the device as a function of DC power flow is then built, wherein the error of the model is bounded. The AC power flow sensor can then be removed from the device. The DC power flow through the device is then measured and the AC power flow for the device is inferred, using the computing device, using the inference model.

In another embodiment the invention is a system. The system comprises a plurality of endpoint devices, each endpoint device having at least one sensor for measuring power flow through the respective device, wherein one or more of the at least one of sensors are DC sensors. The system further comprises an inference module comprising one or more processors programmed to execute software code retrieved from a computer readable storage medium storing software for a method comprising the steps: receiving measurements, over a network, from each of the sensors; and inferring an AC power flow of the plurality of endpoint devices using the measurements, wherein AC power flow for devices having DC sensors is inferred using an inference model developed by measuring the relationship of AC power flow to DC sensor measurements in devices similar to the respective device.

In one embodiment, a system for minimizing network traffic consumption in a power flow management system includes devices operable to generate, consume, or store electric energy, and a power flow management system, which manages power flow transferred between the plurality of devices and a power grid. This minimization system also includes a network to communicate device information and power flow information between the power flow management system and the devices. The device information is received by the power flow management system. The power flow information is transmitted by the power flow management system, and includes an energy rate command received by a devices. The power flow management system reduces consumption of the traffic traversing the network via a network traffic consumption reduction technique.

In one embodiment of a system for communications protocol translation in a power flow management system, the system includes networks that connect electric devices and electric power supplies. One network utilizes a communications protocol that is different from the communications protocol utilized by another network. A communications protocol translation device communicates with the networks, and formulates messages from one communications protocol to the other communications protocol. The reformulated messages pass from one network to another network.

In an embodiment, a system for communicating in a power flow management system utilizing existing hardware includes a smart charging module that is configured to be implemented on an server subsystem in a vehicle. The server subsystem is connected to a shared vehicle-wide communications medium for communication with another subsystem in the vehicle. The module is further configured to provide a set of services using capabilities provided by the server subsystem and the other subsystem. These services includes sending messages, using the shared vehicle-wide communications medium to one subsystem in the vehicle to implement a smart charging program.

In another embodiment, a communications module for providing communication services to vehicle subsystems includes a central processing unit in a vehicle and a CAN-bus transceiver operatively connected to the central processing unit connected to an external bus in the vehicle. The external bus is operatively connected to a vehicle subsystem. The module includes a software stack operatively connected to the central processing unit configured to wrap communications packets in a CAN header for communications packets entering a vehicle from an external network. The software stack is further configured to remove CAN headers for communications packets leaving the vehicle. The module includes software, executed by the central processing unit, configured to translate messages comprising the communications packets from a remote network format to CAN format. The module also includes software, executed by the central processing unit, configured to support a bonding or provisioning process required by an external communications protocol.

In yet another embodiment, an interface enabling the installation of a charge controller for a control extensibility system includes a physical interface to a vehicle's CAN-bus comprising an electrical contact plug. The interface also includes an expansion module providing a standardization of software messages sent over the CAN-bus to control charging. In addition, the interface includes a physical location for the charge controller to reside, where the CAN interface plug is located.

In an embodiment, an interface enabling an electric vehicle to communicate with an electric power supply device without specific hardware includes transmitting information from an electrical load associated with the electric vehicle to an electric power supply by modulating the power transfer between the electrical load and an electric power supply.

In another embodiment, a system for arbitrating a smart chargepoint includes a first smart charging module that is configured to be implemented on equipment located inside a vehicle. The first smart charging module is configured to communicate with a server implementing a smart charging program. The smart charging program coordinating the charging activities of a plurality of vehicles distributed over an area. The first smart charging module is moderates electrical load in the vehicle by reducing the power consumption of the vehicle. In addition, the first smart charging module communicates with a second smart charging module in external equipment responsible for providing electricity to the vehicle, enabling the first smart charging module and the second smart charging module to implement a charge coordination protocol to determine which of the two modules is responsible for communicating with the server implementing the smart charging program.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

FIGS. 2A-2B are diagrams of an example of connections between an electric vehicle, the power grid, and the Internet.

FIG. 3 is a block diagram of an example of connections between an electric resource and a flow control server of the power aggregation system.

DETAILED DESCRIPTION OF THE EMBODIMENTS

Figure 1:
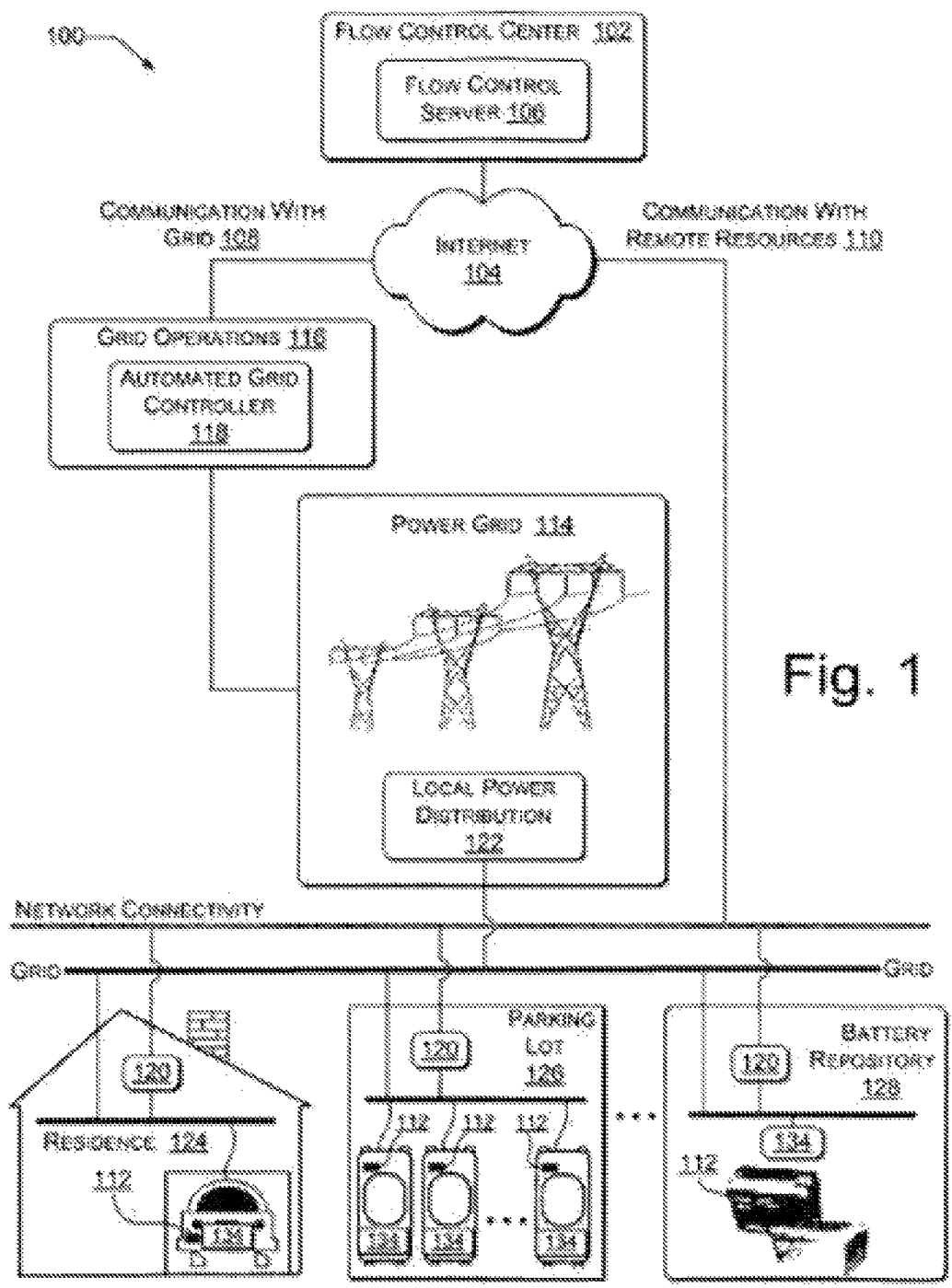
FIG. 1 is a diagram of an example of a power aggregation system.

Reference will now be made in detail to the embodiments of the present invention, examples of which are illustrated in the accompanying drawings.

Overview

Described herein is a power aggregation system for distributed electric resources, and associated methods. In one implementation, a system communicates over the Internet and/or some other public or private networks with numerous individual electric resources connected to a power grid (hereinafter, "grid"). By communicating, the system can dynamically aggregate these electric resources to provide power services to grid operators (e.g. utilities, Independent System Operators (ISO), etc).

"Power services" as used herein, refers to energy delivery as well as other ancillary services including demand response, regulation, spinning reserves, non-spinning reserves, energy imbalance, reactive power, and similar products.

"Aggregation" as used herein refers to the ability to control power flows into and out of a set of spatially distributed electric resources with the purpose of providing a power service of larger magnitude.

"Charge Control Management" as used herein refers to enabling or performing the starting, stopping, or level-setting of a flow of power between a power grid and an electric resource.

"Power grid operator" as used herein, refers to the entity that is responsible for maintaining the operation and stability of the power grid within or across an electric control area. The power grid operator may constitute some combination of manual/human action/intervention and automated processes controlling generation signals in response to system sensors. A "control area operator" is one example of a power grid operator.

"Control area" as used herein, refers to a contained portion of the electrical grid with defined input and output ports. The net flow of power into this area must equal (within some error tolerance) the sum of the power consumption within the area and power outflow from the area.

"Power grid" as used herein means a power distribution system/network that connects producers of power with consumers of power. The network may include generators, transformers, interconnects, switching stations, and safety equipment as part of either/both the transmission system (i.e., bulk power) or the distribution system (i.e. retail power). The power aggregation system is vertically scalable for use within a neighborhood, a city, a sector, a control area, or (for example) one of the eight large-scale Interconnects in the North American Electric Reliability Council (NERC). Moreover, the system is horizontally scalable for use in providing power services to multiple grid areas simultaneously.

"Grid conditions" as used herein, refers to the need for more or less power flowing in or out of a section of the electric power grid, in response to one of a number of conditions, for example supply changes, demand changes, contingencies and failures, ramping events, etc. These grid conditions typically manifest themselves as power quality events such as under- or over-voltage events or under- or over-frequency events.

"Power quality events" as used herein typically refers to manifestations of power grid instability including voltage deviations and frequency deviations; additionally, power quality events as used herein also includes other disturbances in the quality of the power delivered by the power grid such as sub-cycle voltage spikes and harmonics.

"Electric resource" as used herein typically refers to electrical entities that can be commanded to do some or all of these three things: take power (act as load), provide power (act as power generation or source), and store energy. Examples may include battery/charger/inverter systems for electric or hybrid-electric vehicles, repositories of used-but-serviceable electric vehicle batteries, fixed energy storage, fuel cell generators, emergency generators, controllable loads, etc.

"Electric vehicle" is used broadly herein to refer to pure electric and hybrid electric vehicles, such as plug-in hybrid electric vehicles (PHEVs), especially vehicles that have significant storage battery capacity and that connect to the power grid for recharging the battery. More specifically, electric vehicle means a vehicle that gets some or all of its energy for motion and other purposes from the power grid. Moreover, an electric vehicle has an energy storage system, which may consist of batteries, capacitors, etc., or some combination thereof. An electric vehicle may or may not have the capability to provide power back to the electric grid.

Electric vehicle "energy storage systems" (batteries, super capacitors, and/or other energy storage devices) are used herein as a representative example of electric resources intermittently or permanently connected to the grid that can have dynamic input and output of power. Such batteries can function as a power source or a power load. A collection of aggregated electric vehicle batteries can become a statistically stable resource across numerous batteries, despite recognizable tidal connection trends (e.g., an increase in the total number of vehicles connected to the grid at night; a downswing in the collective number of connected batteries as the morning commute begins, etc.) Across vast numbers of electric vehicle batteries, connection trends are predictable and such batteries become a stable and reliable resource to call upon, should the grid or a part of the grid (such as a person's home in a blackout) experience a need for increased or decreased power. Data collection and storage also enable the power aggregation system to predict connection behavior on a per-user basis.

An Example of the Presently Disclosed System

FIG. 1 shows a power aggregation system 100. A flow control center 102 is communicatively coupled with a network, such as a public/private mix that includes the Internet 104, and includes one or more servers 106 providing a centralized power aggregation service. "Internet" 104 will be used herein as representative of many different types of communicative networks and network mixtures (e.g., one or more wide area networks—public or private—and/or one or more local area networks). Via a network, such as the Internet 104, the flow control center 102 maintains communication 108 with operators of power grid(s), and communication 110 with remote resources, i.e., communication with peripheral electric resources 112 ("end" or "terminal" nodes/devices of a power network) that are connected to the power grid 114. In one implementation, power line communicators (PLCs), such as those that include or consist of Ethernet-over-power line bridges 120 are implemented at connection locations so that the "last mile" (in this case, last feet—e.g., in a residence 124) of Internet communication with remote resources is implemented over the same wire that connects each electric resource 112 to the power grid 114. Thus, each physical location of each electric resource 112 may be associated with a corresponding Ethernet-over-power line bridge 120 (hereinafter, "bridge") at or near the same location as the electric resource 112. Each bridge 120 is typically connected to an Internet access point of a location owner, as will be described in greater detail below. The communication medium from flow control center 102 to the connection location, such as residence 124, can take many forms, such as cable modem, DSL, satellite, fiber, WiMax, etc. In a variation, electric resources 112 may connect with the Internet by a different medium than the same power wire that connects them to the power grid 114. For example, a given electric resource 112 may have its own wireless capability to connect directly with the Internet 104 or an Internet access point and thereby with the flow control center 102.

Electric resources 112 of the power aggregation system 100 may include the batteries of electric vehicles connected to the power grid 114 at residences 124, parking lots 126 etc.; batteries in a repository 128, fuel cell generators, private dams, conventional power plants, and other resources that produce electricity and/or store electricity physically or electrically.

In one implementation, each participating electric resource 112 or group of local resources has a corresponding remote intelligent power flow (IPF) module 134 (hereinafter, "remote IPF module" 134). The centralized flow control center 102 administers the power aggregation system 100 by communicating with the remote IPF modules 134 distributed peripherally among the electric resources 112. The remote IPF modules 134 perform several different functions, including, but not limited to, providing the flow control center 102 with the statuses of remote resources; controlling the amount, direction, and timing of power being transferred into or out of a remote electric resource 112; providing metering of power being transferred into or out of a remote electric resource 112; providing safety measures during power transfer and changes of conditions in the power grid 114; logging activities; and providing self-contained control of power transfer and safety measures when communication with the flow control center 102 is interrupted. The remote IPF modules 134 will be described in greater detail below.

Figure 2B:
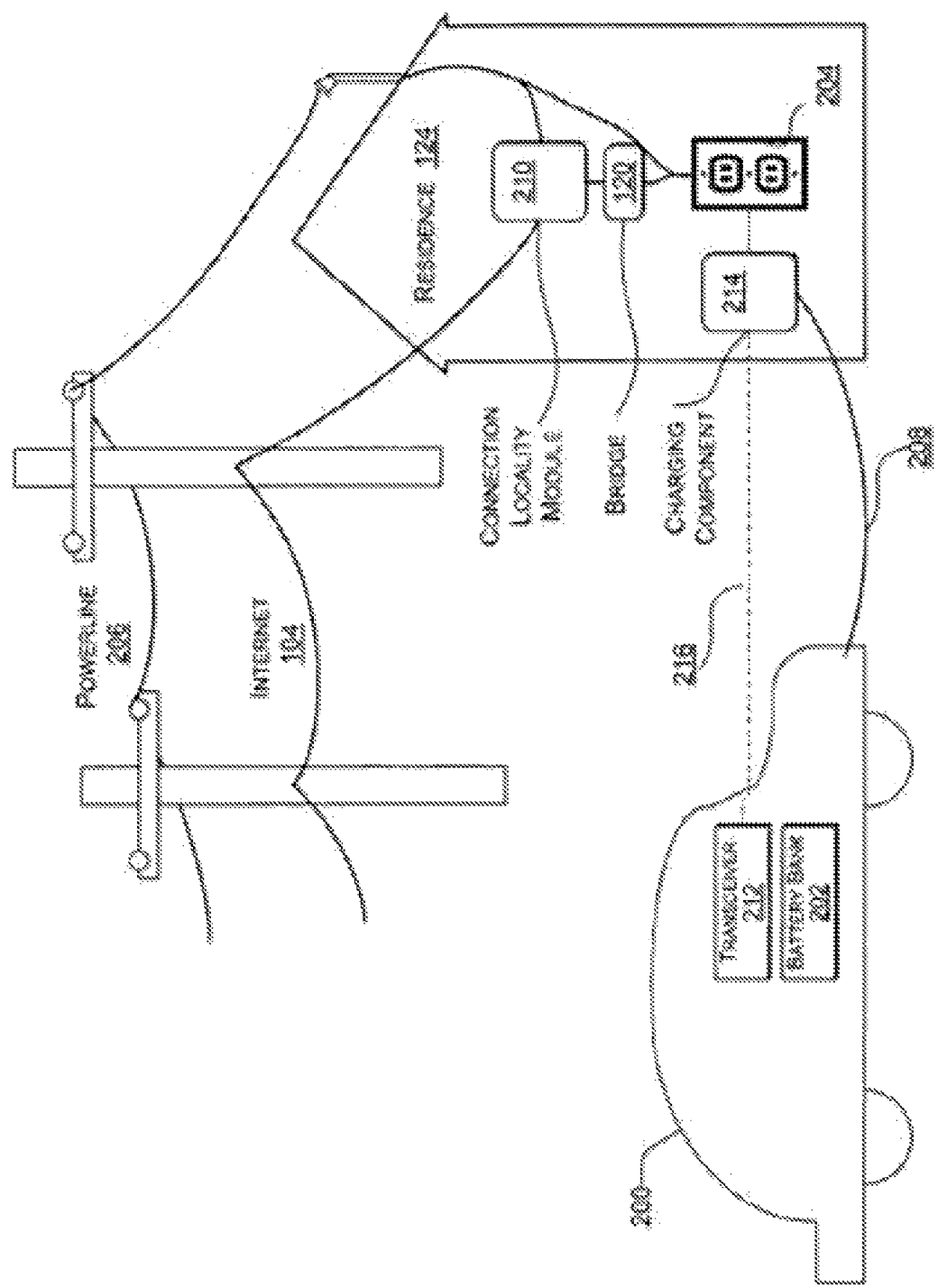

In another implementation, instead of having an IPF module 134, each electric resource 112 may have a corresponding transceiver (not shown) to communicate with a local charging component (not shown). The transceiver and charging component, in combination, may communicate with flow control center 102 to perform some or all of the above mentioned functions of IPF module 134. A transceiver and charging component are shown in FIG. 2B and are described in greater detail herein.

FIG. 2A shows another view of electrical and communicative connections to an electric resource 112. In this example, an electric vehicle 200 includes a battery bank 202 and a remote IPF module 134. The electric vehicle 200 may connect to a conventional wall receptacle (wall outlet) 204 of a residence 124, the wall receptacle 204 representing the peripheral edge of the power grid 114 connected via a residential powerline 206.

In one implementation, the power cord 208 between the electric vehicle 200 and the wall outlet 204 can be composed of only conventional wire and insulation for conducting alternating current (AC) power to and from the electric vehicle 200. In FIG. 2A, a location-specific connection locality module 210 performs the function of network access point—in this case, the Internet access point. A bridge 120 intervenes between the receptacle 204 and the network access point so that the power cord 208 can also carry network communications between the electric vehicle 200 and the receptacle 204. With such a bridge 120 and connection locality module 210 in place in a connection location, no other special wiring or physical medium is needed to communicate with the remote IPF module 134 of the electric vehicle 200 other than a conventional power cord 208 for providing residential line current at any conventional voltage. Upstream of the connection locality module 210, power and communication with the electric vehicle 200 are resolved into the powerline 206 and an Internet cable 104.

Alternatively, the power cord 208 may include safety features not found in conventional power and extension cords. For example, an electrical plug 212 of the power cord 208 may include electrical and/or mechanical safeguard components to prevent the remote IPF module 134 from electrifying or exposing the male conductors of the power cord 208 when the conductors are exposed to a human user.

In some embodiments, a radio frequency (RF) bridge (not shown) may assist the remote IPF module 134 in communicating with a foreign system, such as a utility smart meter (not shown) and/or a connection locality module 210. For example, the remote IPF module 134 may be equipped to communicate over power cord 208 or to engage in some form of RF communication, such as Zigbee or Bluetooth™, and the foreign system may be able to engage in a different form of RF communication. In such an implementation, the RF bridge may be equipped to communicate with both the foreign system and remote IPF module 134 and to translate communications from one to a form the other may understand, and to relay those messages. In various embodiments, the RF bridge may be integrated into the remote IPF module 134 or foreign system, or may be external to both. The communicative associations between the RF bridge and remote IPF module 134 and between the RF bridge and foreign system may be via wired or wireless communication.

FIG. 2B shows a further view of electrical and communicative connections to an electric resource 112. In this example, the electric vehicle 200 may include a transceiver 212 rather than a remote IPF module 134. The transceiver 212 may be communicatively coupled to a charging component 214 through a connection 216, and the charging component itself may be coupled to a conventional wall receptacle (wall outlet) 204 of a residence 124 and to electric vehicle 200 through a power cord 208. The other components shown in FIG. 2B may have the couplings and functions discussed with regard to FIG. 2A.

In various embodiments, transceiver 212 and charging component 214 may, in combination, perform the same functions as the remote IPF module 134. Transceiver 212 may interface with computer systems of electric vehicle 200 and communicate with charging component 214, providing charging component 214 with information about electric vehicle 200, such as its vehicle identifier, a location identifier, and a state of charge. In response, transceiver 212 may receive requests and commands which transceiver 212 may relay to vehicle 200's computer systems.

Charging component 214, being coupled to both electric vehicle 200 and wall outlet 204, may effectuate charge control of the electric vehicle 200. If the electric vehicle 200 is not capable of charge control management, charging component 214 may directly manage the charging of electric vehicle 200 by stopping and starting a flow of power between the electric vehicle 200 and a power grid 114 in response to commands received from a flow control server 106. If, on the other hand, the electric vehicle 200 is capable of charge control management, charging component 214 may effectuate charge control by sending commands to the electric vehicle 200 through the transceiver 212.

In some embodiments, the transceiver 212 may be physically coupled to the electric vehicle 200 through a data port, such as an OBD-II connector. In other embodiments, other couplings may be used. The connection 216 between transceiver 212 and charging component 214 may be a wireless signal, such as a radio frequency (RF), such as a Zigbee, or Bluetooth™ signal. And charging component 214 may include a receiver socket to couple with power cord 208 and a plug to couple with wall outlet 204. In one embodiment, charging component 214 may be coupled to connection locality module 210 in either a wired or wireless fashion. For example, charging component 214 might have a data interface for communicating wirelessly with both the transceiver 212 and locality module 210. In such an embodiment, the bridge 120 may not be required.

Figure 8A:
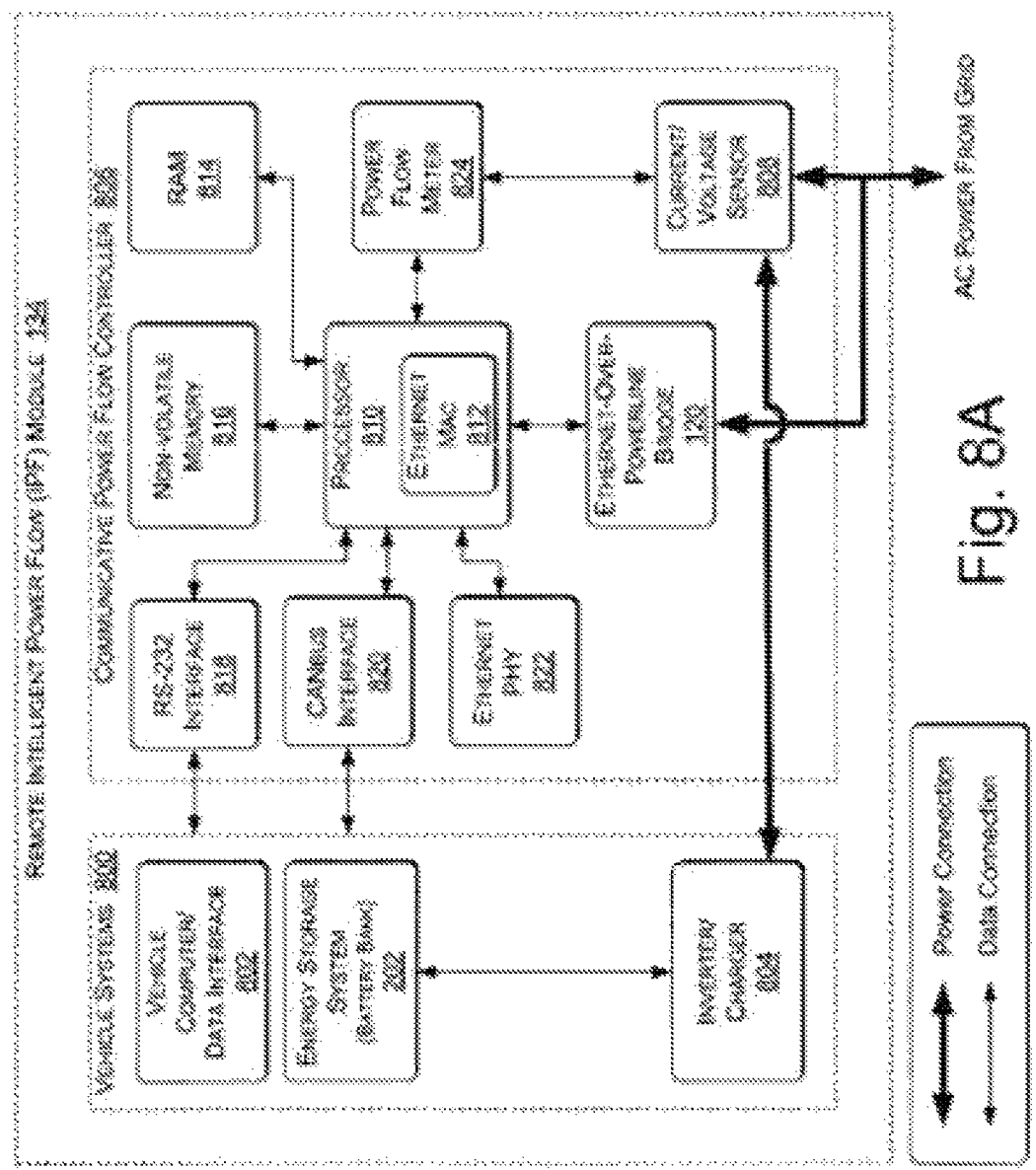
FIG. 8A is a block diagram of an example of remote intelligent power flow module.
Figure 8B:
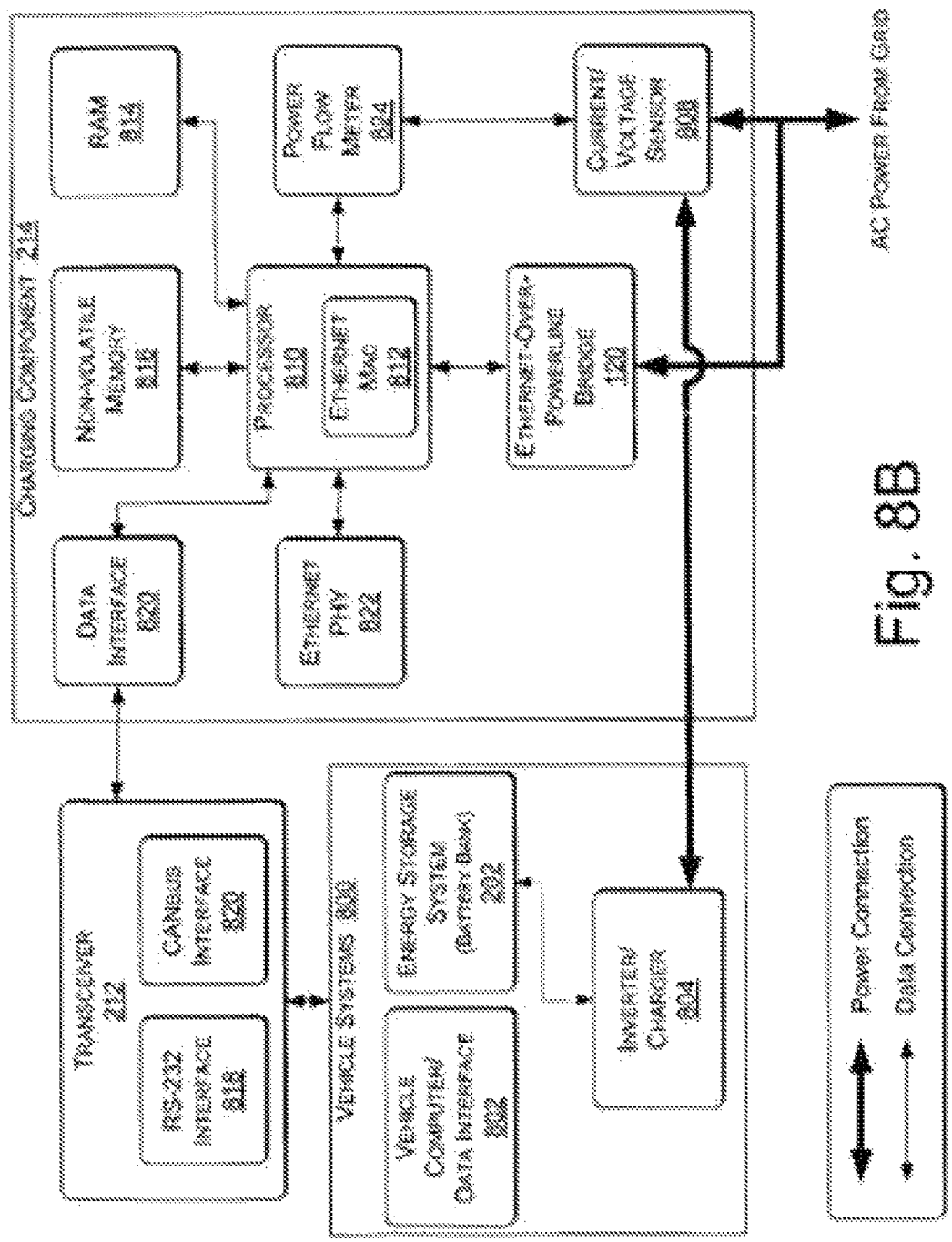
FIG. 8B is a block diagram of an example of transceiver and charging component combination.

Further details about the transceiver 212 and charging component 214 are illustrated by FIG. 8B and described in greater detail herein.

FIG. 3 shows another implementation of the connection locality module 210 of FIG. 2, in greater detail. In FIG. 3, an electric resource 112 has an associated remote IPF module 134, including a bridge 120. The power cord 208 connects the electric resource 112 to the power grid 114 and also to the connection locality module 210 in order to communicate with the flow control server 106.

The connection locality module 210 includes another instance of a bridge 120, connected to a network access point 302, which may include such components as a router, switch, and/or modem, to establish a hardwired or wireless connection with, in this case, the Internet 104. In one implementation, the power cord 208 between the two bridges 120 and 120' is replaced by a wireless Internet link, such as a wireless transceiver in the remote IPF module 134 and a wireless router in the connection locality module 210.

In other embodiments, a transceiver 212 and charging component 214 may be used instead of a remote IPF module 134. In such an embodiment, the charging component 214 may include or be coupled to a bridge 120, and the connection locality module 210 may also include a bridge 120', as shown. In yet other embodiments, not shown, charging component 214 and connection locality module 210 may communicate in a wired or wireless fashion, as mentioned previously, without bridges 120 and 120'. The wired or wireless communication may utilize any sort of connection technology known in the art, such as Ethernet or RF communication, such as Zigbee, or Bluetooth™.

System Layouts

Figure 4:
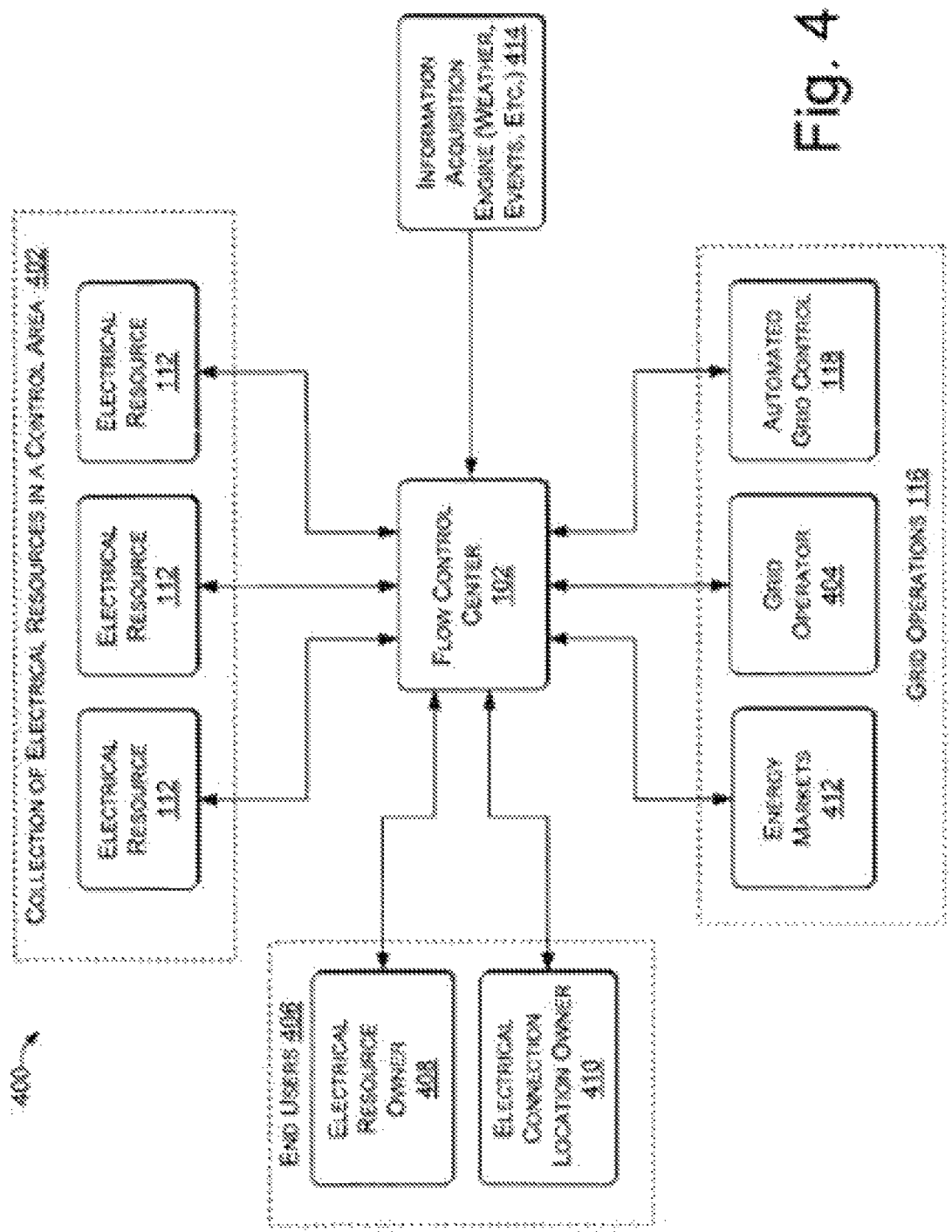
FIG. 4 is a diagram of an example of a layout of the power aggregation system.

FIG. 4 shows a layout 400 of the power aggregation system 100. The flow control center 102 can be connected to many different entities, e.g., via the Internet 104, for communicating and receiving information. The layout 400 includes electric resources 112, such as plug-in electric vehicles 200, physically connected to the grid within a single control area 402. The electric resources 112 become an energy resource for grid operators 404 to utilize.

The layout 400 also includes end users 406 classified into electric resource owners 408 and electrical connection location owners 410, who may or may not be one and the same. In fact, the stakeholders in a power aggregation system 100 include the system operator at the flow control center 102, the grid operator 404, the resource owner 408, and the owner of the location 410 at which the electric resource 112 is connected to the power grid 114.

Electrical connection location owners 410 can include:

Rental car lots—rental car companies often have a large portion of their fleet parked in the lot. They can purchase fleets of electric vehicles 200 and, participating in a power aggregation system 100, generate revenue from idle fleet vehicles.

Public parking lots—parking lot owners can participate in the power aggregation system 100 to generate revenue from parked electric vehicles 200. Vehicle owners can be offered free parking, or additional incentives, in exchange for providing power services.

Workplace parking—employers can participate in a power aggregation system 100 to generate revenue from parked employee electric vehicles 200. Employees can be offered incentives in exchange for providing power services.

Residences—a home garage can merely be equipped with a connection locality module 210 to enable the homeowner to participate in the power aggregation system 100 and generate revenue from a parked car. Also, the vehicle battery 202 and associated power electronics within the vehicle can provide local power backup power during times of peak load or power outages.

Residential neighborhoods—neighborhoods can participate in a power aggregation system 100 and be equipped with power-delivery devices (deployed, for example, by homeowner cooperative groups) that generate revenue from parked electric vehicles 200.

The grid operations 116 of FIG. 4 collectively include interactions with energy markets 412, the interactions of grid operators 404, and the interactions of automated grid controllers 118 that perform automatic physical control of the power grid 114.

The flow control center 102 may also be coupled with information sources 414 for input of weather reports, events, price feeds, etc. Other data sources 414 include the system stakeholders, public databases, and historical system data, which may be used to optimize system performance and to satisfy constraints on the power aggregation system 100.

Thus, a power aggregation system 100 may consist of components that:

communicate with the electric resources 112 to gather data and actuate charging/discharging of the electric resources 112;

gather real-time energy prices;

gather real-time resource statistics;

predict behavior of electric resources 112 (connectedness, location, state (such as battery State-Of-Charge) at a given time of interest, such as a time of connect/disconnect);

predict behavior of the power grid 114/load;

encrypt communications for privacy and data security;

actuate charging of electric vehicles 200 to optimize some figure(s) of merit;

offer guidelines or guarantees about load availability for various points in the future, etc.

These components can be running on a single computing resource (computer, etc.), or on a distributed set of resources (either physically co-located or not).

Power aggregation systems 100 in such a layout 400 can provide many benefits: for example, lower-cost ancillary services (i.e., power services), fine-grained (both temporal and spatial) control over resource scheduling, guaranteed reliability and service levels, increased service levels via intelligent resource scheduling, and/or firming of intermittent generation sources such as wind and solar power generation.

The power aggregation system 100 enables a grid operator 404 to control the aggregated electric resources 112 connected to the power grid 114. An electric resource 112 can act as a power source, load, or storage, and the resource 112 may exhibit combinations of these properties. Control of a set of electric resources 112 is the ability to actuate power consumption, generation, or energy storage from an aggregate of these electric resources 112.

Figure 5:
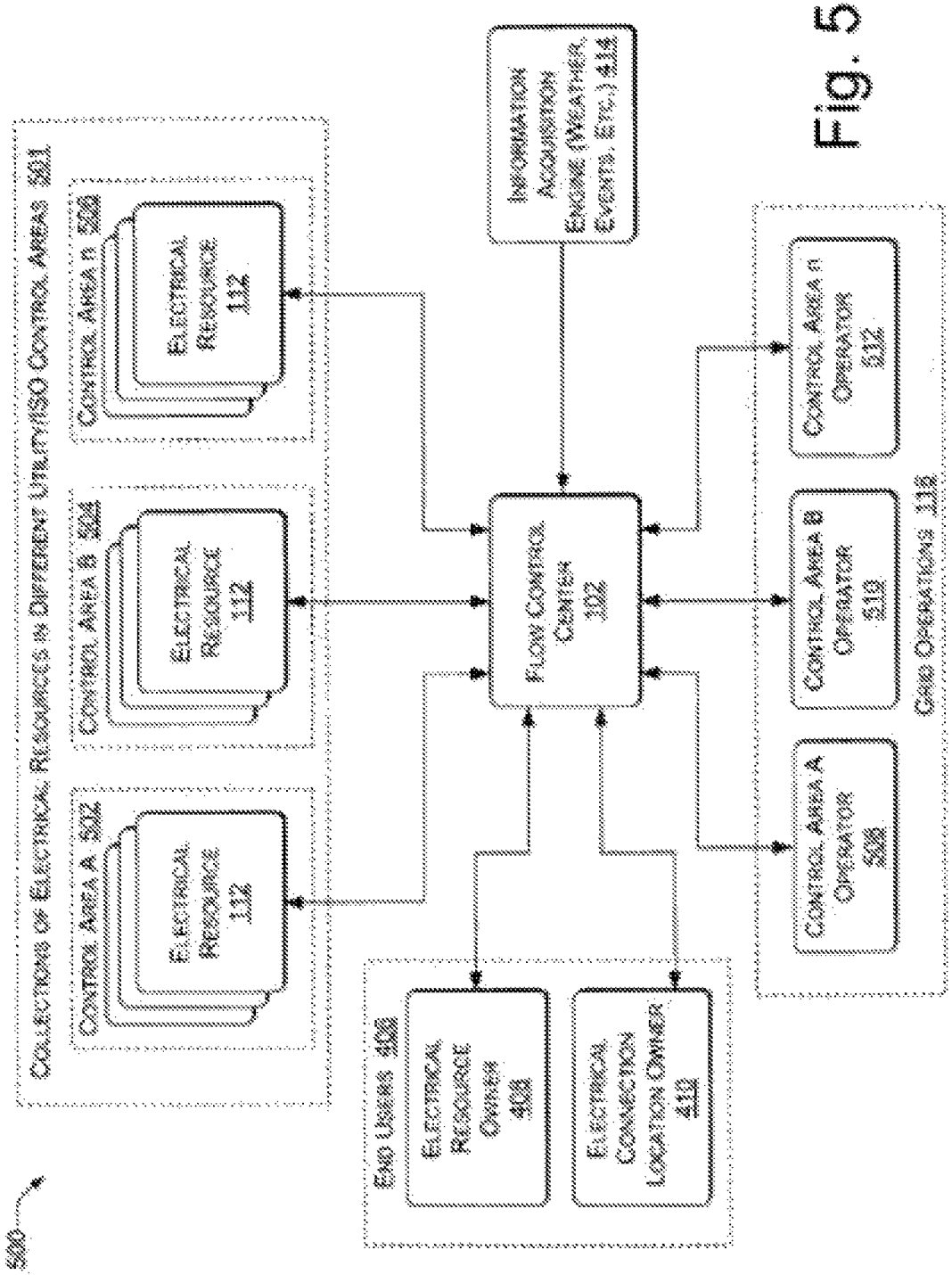
FIG. 5 is a diagram of an example of control areas in the power aggregation system.

FIG. 5 shows the role of multiple control areas 402 in the power aggregation system 100. Each electric resource 112 can be connected to the power aggregation system 100 within a specific electrical control area. A single instance of the flow control center 102 can administer electric resources 112 from multiple distinct control areas 501 (e.g., control areas 502, 504, and 506). In one implementation, this functionality is achieved by logically partitioning resources within the power aggregation system 100. For example, when the control areas 402 include an arbitrary number of control areas, control area "A" 502, control area "B" 504, . . . , control area "n" 506, then grid operations 116 can include corresponding control area operators 508, 510, . . . , and 512. Further division into a control hierarchy that includes control division groupings above and below the illustrated control areas 402 allows the power aggregation system 100 to scale to power grids 114 of different magnitudes and/or to varying numbers of electric resources 112 connected with a power grid 114.

Figure 6:
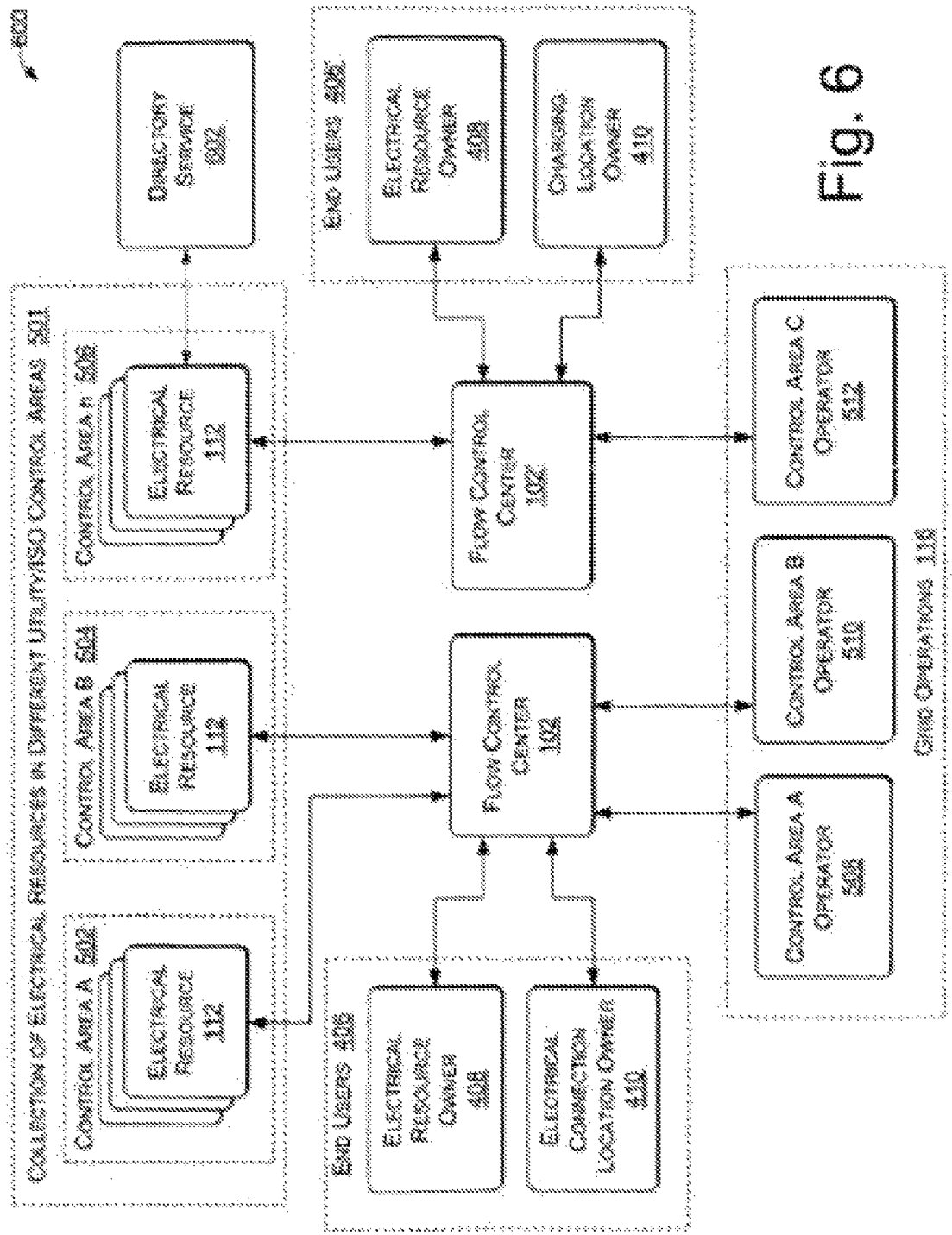
FIG. 6 is a diagram of multiple flow control centers in the power aggregation system and a directory server for determining a flow control center.

FIG. 6 shows a layout 600 of a power aggregation system 100 that uses multiple centralized flow control centers 102 and 102' and a directory server 602 for determining a flow control center. Each flow control center 102 and 102' has its own respective end users 406 and 406'. Control areas 402 to be administered by each specific instance of a flow control center 102 can be assigned dynamically. For example, a first flow control center 102 may administer control area A 502 and control area B 504, while a second flow control center 102' administers control area n 506. Likewise, corresponding control area operators (508, 510, and 512) are served by the same flow control center 102 that serves their respective different control areas.

In various embodiments, an electric resource may determine which flow control center 102/102' administers its control area 502/504/506 by communicating with a directory server 602. The address of the directory server 602 may be known to electric resource 112 or its associated IPF module 134 or charging component 214. Upon plugging in, the electric resource 112 may communicate with the directory server 602, providing the directory server 112 with a resource identifier and/or a location identifier. Based on this information, the directory server 602 may respond, identifying which flow control center 102/102' to use.

In another embodiment, directory server 602 may be integrated with a flow control server 106 of a flow control center 102/102'. In such an embodiment, the electric resource 112 may contact the server 106. In response, the server 106 may either interact with the electric resource 112 itself or forward the connection to another flow control center 102/102' responsible for the location identifier provided by the electric resource 112.

In some embodiments, whether integrated with a flow control server 106 or not, directory server 602 may include a publicly accessible database for mapping locations to flow control centers 102/102'.

Flow Control Server

Figure 7:
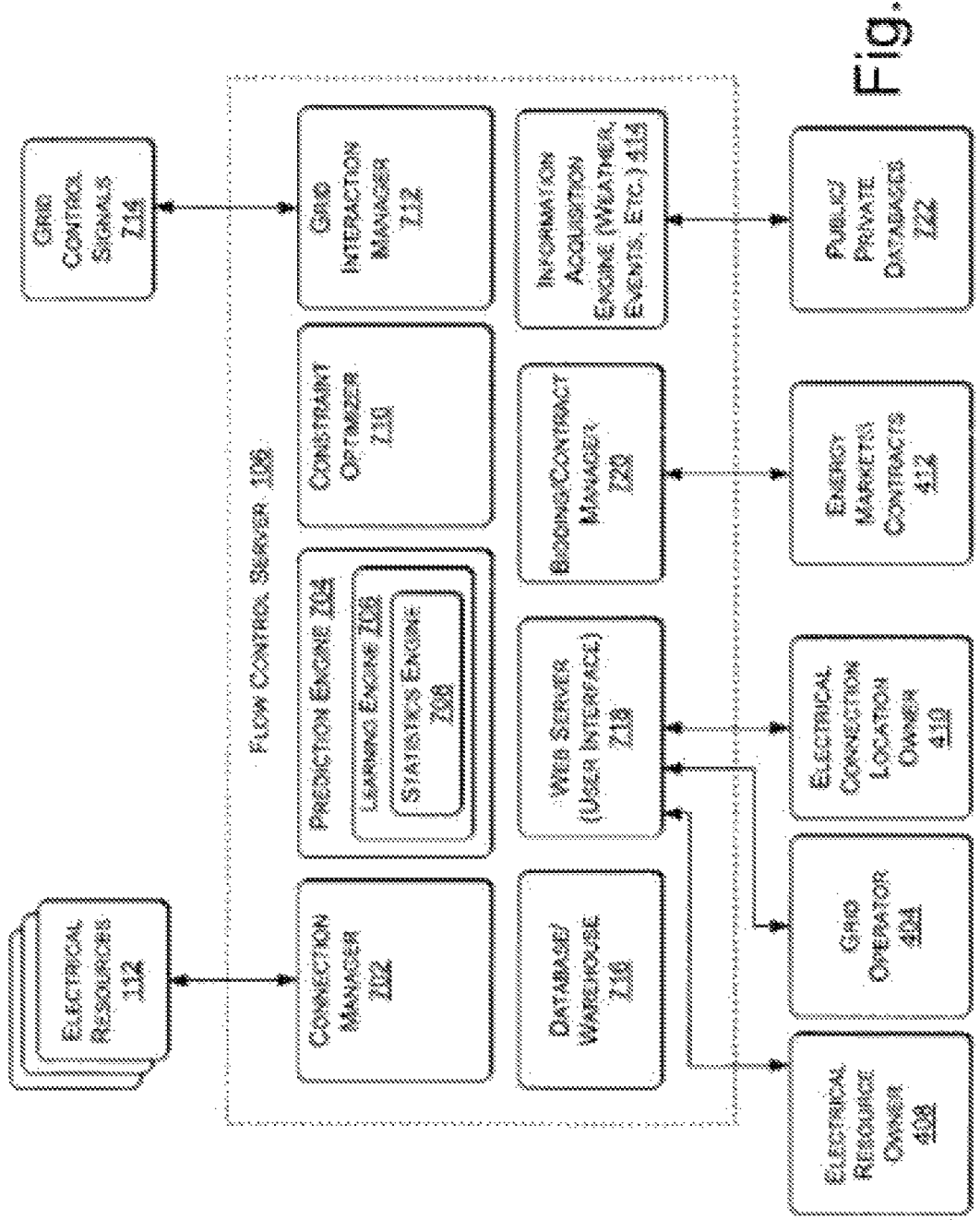
FIG. 7 is a block diagram of an example of flow control server.

FIG. 7 shows a server 106 of the flow control center 102. The illustrated implementation in FIG. 7 is only one example configuration, for descriptive purposes. Many other arrangements of the illustrated components or even different components constituting a server 106 of the flow control center 102 are possible within the scope of the subject matter. Such a server 106 and flow control center 102 can be executed in hardware, software, or combinations of hardware, software, firmware, etc.

The flow control server 106 includes a connection manager 702 to communicate with electric resources 112, a prediction engine 704 that may include a learning engine 706 and a statistics engine 708, a constraint optimizer 710, and a grid interaction manager 712 to receive grid control signals 714. Grid control signals 714 are sometimes referred to as generation control signals, such as automated generation control (AGC) signals. The flow control server 106 may further include a database/information warehouse 716, a web server 718 to present a user interface to electric resource owners 408, grid operators 404, and electrical connection location owners 410; a contract manager 720 to negotiate contract terms with energy markets 412, and an information acquisition engine 414 to track weather, relevant news events, etc., and download information from public and private databases 722 for predicting behavior of large groups of the electric resources 112, monitoring energy prices, negotiating contracts, etc.

Remote IPF Module

FIG. 8A shows the remote IPF module 134 of FIGS. 1 and 2 in greater detail. The illustrated remote IPF module 134 is only one example configuration, for descriptive purposes. Many other arrangements of the illustrated components or even different components constituting a remote IPF module 134 are possible within the scope of the subject matter. Such a remote IPF module 134 has some hardware components and some components that can be executed in hardware, software, or combinations of hardware, software, firmware, etc. In other embodiments, executable instructions configured to perform some or all of the operations of remote IPF module 134 may be added to hardware of an electric resource 112 such as an electric vehicle that, when combined with the executable instructions, provides equivalent functionality to remote IPF module 134. References to remote IPF module 134 as used herein include such executable instructions.

The illustrated example of a remote IPF module 134 is represented by an implementation suited for an electric vehicle 200. Thus, some vehicle systems 800 are included as part of the remote IPF module 134 for the sake of description. However, in other implementations, the remote IPF module 134 may exclude some or all of the vehicles systems 800 from being counted as components of the remote IPF module 134.

The depicted vehicle systems 800 include a vehicle computer and data interface 802, an energy storage system, such as a battery bank 202, and an inverter/charger 804. Besides vehicle systems 800, the remote IPF module 134 also includes a communicative power flow controller 806. The communicative power flow controller 806 in turn includes some components that interface with AC power from the grid 114, such as a powerline communicator, for example an Ethernet-over-powerline bridge 120, and a current or current/voltage (power) sensor 808, such as a current sensing transformer.

The communicative power flow controller 806 also includes Ethernet and information processing components, such as a processor 810 or microcontroller and an associated Ethernet media access control (MAC) address 812; volatile random access memory 814, nonvolatile memory 816 or data storage, an interface such as an RS-232 interface 818 or a CANbus interface 820; an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The communicative power flow controller 806 also includes a bidirectional power flow meter 824 that tracks power transfer to and from each electric resource 112, in this case the battery bank 202 of an electric vehicle 200.

The communicative power flow controller 806 operates either within, or connected to an electric vehicle 200 or other electric resource 112 to enable the aggregation of electric resources 112 introduced above (e.g., via a wired or wireless communication interface). These above-listed components may vary among different implementations of the communicative power flow controller 806, but implementations typically include:

an intra-vehicle communications mechanism that enables communication with other vehicle components;
a mechanism to communicate with the flow control center 102;
a processing element;
a data storage element;
a power meter; and
optionally, a user interface.

Implementations of the communicative power flow controller 806 can enable functionality including:

executing pre-programmed or learned behaviors when the electric resource 112 is offline (not connected to Internet 104, or service is unavailable);
storing locally-cached behavior profiles for "roaming" connectivity (what to do when charging on a foreign system, i.e., when charging in the same utility territory on a foreign meter or in a separate utility territory, or in disconnected operation, i.e., when there is no network connectivity);
allowing the user to override current system behavior; and
metering power-flow information and caching meter data during offline operation for later transaction.

Thus, the communicative power flow controller 806 includes a central processor 810, interfaces 818 and 820 for communication within the electric vehicle 200, a powerline communicator, such as an Ethernet-over-powerline bridge 120 for communication external to the electric vehicle 200, and a power flow meter 824 for measuring energy flow to and from the electric vehicle 200 via a connected AC powerline 208.

Power Flow Meter

Power is the rate of energy consumption per interval of time. Power indicates the quantity of energy transferred during a certain period of time, thus the units of power are quantities of energy per unit of time. The power flow meter 824 measures power for a given electric resource 112 across a bidirectional flow—e.g., power from grid 114 to electric vehicle 200 or from electric vehicle 200 to the grid 114. In one implementation, the remote IPF module 134 can locally cache readings from the power flow meter 824 to ensure accurate transactions with the central flow control server 106, even if the connection to the server is down temporarily, or if the server itself is unavailable.

Transceiver and Charging Component

FIG. 8B shows the transceiver 212 and charging component 214 of FIG. 2B in greater detail. The illustrated transceiver 212 and charging component 214 is only one example configuration, for descriptive purposes. Many other arrangements of the illustrated components or even different components constituting the transceiver 212 and charging component 214 are possible within the scope of the subject matter. Such a transceiver 212 and charging component 214 have some hardware components and some components that can be executed in hardware, software, or combinations of hardware, software, firmware, etc.

The illustrated example of the transceiver 212 and charging component 214 is represented by an implementation suited for an electric vehicle 200. Thus, some vehicle systems 800 are illustrated to provide context to the transceiver 212 and charging component 214 components.

The depicted vehicle systems 800 include a vehicle computer and data interface 802, an energy storage system, such as a battery bank 202, and an inverter/charger 804. In some embodiments, vehicle systems 800 may include a data port, such as an OBD-II port, that is capable of physically coupling with the transceiver 212. The transceiver 212 may then communicate with the vehicle computer and data interface 802 through the data port, receiving information from electric resource 112 comprised by vehicle systems 800 and, in some embodiments, providing commands to the vehicle computer and data interface 802. In one implementation, the vehicle computer and data interface 802 may be capable of charge control management. In such an embodiment, the vehicle computer and data interface 802 may perform some or all of the charging component 214 operations discussed below. In other embodiments, executable instructions configured to perform some or all of the operations of the vehicle computer and data interface 802 may be added to hardware of an electric resource 112 such as an electric vehicle that, when combined with the executable instructions, provides equivalent functionality to the vehicle computer and data interface 802. References to the vehicle computer and data interface 802 as used herein include such executable instructions.

In various embodiments, the transceiver 212 may have a physical form that is capable of coupling to a data port of vehicle systems 800. Such a transceiver 212 may include a plurality of interfaces, such as an RS-232 interface 818 and/or a CANBus interface 820. In various embodiments, the RS-232 interface 818 or CANBus interface 820 may enable the transceiver 212 to communicate with the vehicle computer and data interface 802 through the data port. Also, the transceiver may be or comprise an additional interface (not shown) capable of engaging in wireless communication with a data interface 820 of the charging component 214. The wireless communication may be of any form known in the art, such as radio frequency (RF) communication (e.g., Zigbee, and/or Bluetooth™ communication). In other embodiments, the transceiver may comprise a separate conductor or may be configured to utilize a powerline 208 to communicate with charging component 214. In yet other embodiments, not shown, transceiver 212 may simply be a radio frequency identification (RFID) tag capable of storing minimal information about the electric resource 112, such as a resource identifier, and of being read by a corresponding RFID reader of charging component 214. In such other embodiments, the RFID tag might not couple with a data port or communicate with the vehicle computer and data interface 802.

As shown, the charging component 214 may be an intelligent plug device that is physically connected to a charging medium, such as a powerline 208 (the charging medium coupling the charging component 214 to the electric resource 112) and an outlet of a power grid (such as the wall outlet 204 shown in FIG. 2B). In other embodiments charging component 214 may be a charging station or some other external control. In some embodiments, the charging component 214 may be portable.

In various embodiments, the charging component 214 may include components that interface with AC power from the grid 114, such as a powerline communicator, for example an Ethernet-over-powerline bridge 120, and a current or current/voltage (power) sensor 808, such as a current sensing transformer.

In other embodiments, the charging component 214 may include a further Ethernet plug or wireless interface in place of bridge 120. In such an embodiment, data-over-powerline communication is not necessary, eliminating the need for a bridge 120. The Ethernet plug or wireless interface may communicate with a local access point, and through that access point to flow control server 106.

The charging component 214 may also include Ethernet and information processing components, such as a processor 810 or microcontroller and an associated Ethernet media access control (MAC) address 812; volatile random access memory 814, nonvolatile memory 816 or data storage, a data interface 826 for communicating with the transceiver 212, and an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The charging component 214 may also include a bidirectional power flow meter 824 that tracks power transfer to and from each electric resource 112, in this case the battery bank 202 of an electric vehicle 200.

Further, in some embodiments, the charging component 214 may comprise an RFID reader to read the electric resource information from transceiver 212 when transceiver 212 is an RFID tag.

Also, in various embodiments, the charging component 214 may include a credit card reader to enable a user to identify the electric resource 112 by providing credit card information. In such an embodiment, a transceiver 212 may not be necessary.

Additionally, in one embodiment, the charging component 214 may include a user interface, such as one of the user interfaces described in greater detail below.

Implementations of the charging component 214 can enable functionality including:
  executing pre-programmed or learned behaviors when the electric resource 112 is offline (not connected to Internet 104, or service is unavailable);
  storing locally-cached behavior profiles for "roaming" connectivity (what to do when charging on a foreign system or in disconnected operation, i.e., when there is no network connectivity);
  allowing the user to override current system behavior; and
  metering power-flow information and caching meter data during offline operation for later transaction.

User Interfaces (UI)

Charging Station UI. An electrical charging station, whether free or for pay, can be installed with a user interface that presents useful information to the user. Specifically, by collecting information about the grid 114, the electric resource state, and the preferences of the user, the station can present information such as the current electricity price, the estimated recharge cost, the estimated time until recharge, the estimated payment for uploading power to the grid 114 (either total or per hour), etc. The information acquisition engine 414 communicates with the electric resource 112 and with public and/or private data networks 722 to acquire the data used in calculating this information.

The types of information gathered from the electric resource 112 could include an electric resource identifier (resource ID) and state information like the state of charge of the electric resource 112. The resource ID could be used to obtain knowledge of the electric resource type and capabilities, preferences, etc. through lookup with the flow control server 106.

In various embodiments, the charging station system including the UI might also gather grid-based information, such as current and future energy costs at the charging station.

User Charge Control UI Mechanisms. In various embodiments, by default, electric resources 112 may receive charge control management via power aggregation system 100. In some embodiments, an override control may be provided to override charge control management and charge as soon as possible. The override control may be provided, in various embodiments, as a user interface mechanism of the remote IPF module 134, the charging component 214, of the electric resource (for example, if electric resource is a vehicle 200, the user interface control may be integrated with dash controls of the vehicle 200) or even via a web page offered by flow control server 106. The control could be presented, for example, as a button, a touch screen option, a web page, or some other UI mechanism. In one embodiment, the UI may be the UI illustrated by FIG. 8C and discussed in greater detail below. In some embodiments, the override would be a one-time override, only applying to a single plug-in session. Upon disconnecting and reconnecting, the user may again need to interact with the UI mechanism to override the charge control management.

In some embodiments, the user may pay more to charge with the override on than under charge control management, thus providing an incentive for the user to accept charge control management. Such a cost differential may be displayed or rendered to the user in conjunction with or on the UI mechanism. This differential could take into account time-varying pricing, such as Time of Use (TOU), Critical Peak Pricing (CPP), and Real-Time Pricing (RTP) schemes, as discussed above, as well as any other incentives, discounts, or payments that might be forgone by not accepting charge control management.

UI Mechanism for Management Preferences. In various embodiments, a user interface mechanism of the remote IPF module 134, the charging component 214, of the electric resource (for example, if electric resource is a vehicle 200, the user interface control may be integrated with dash controls of the vehicle 200) or even via a web page offered by flow control server 106 may enable a user to enter and/or edit management preferences to affect charge control management of the user's electric resource 112. In some embodiments, the UI mechanism may allow the user to enter/edit general preferences, such as whether charge control management is enabled, whether vehicle-to-grid power flow is enabled or whether the electric resource 112 should only be charged with clean/green power. Also, in various embodiments, the UI mechanism may enable a user to prioritize relative desires for minimizing costs, maximizing payments (i.e., fewer charge periods for higher amounts), achieving a full state-of-charge for the electric resource 112, charging as rapidly as possible, and/or charging in as environmentally-friendly a way as possible. Additionally, the UI mechanism may enable a user to provide a default schedule for when the electric resource will be used (for example, if resource 112 is a vehicle 200, the schedule would be for when the vehicle 200 should be ready to drive). Further, the UI mechanism may enable the user to add or select special rules, such as a rule not to charge if a price threshold is exceeded or a rule to only use charge control management if it will earn the user at least a specified threshold of output. Charge control management may then be effectuated based on any part or all of these user entered preferences.

Figure 8C:
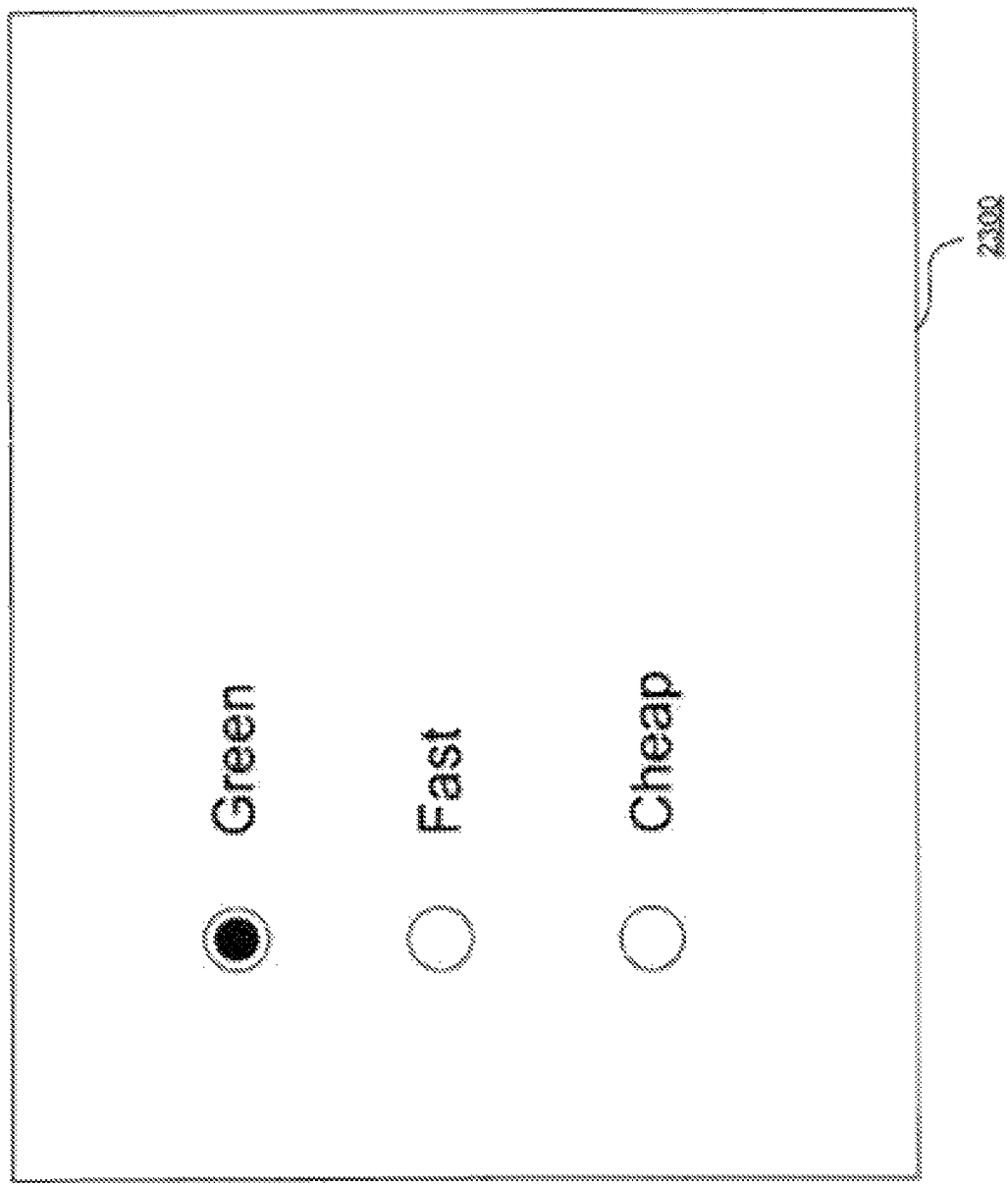
FIG. 8C is an illustration of an example of simple user interface for facilitating user controlled charging.

Simple User Interface. FIG. 8C illustrates a simple user interface (UI) which enables a user to control charging based on selecting among a limited number of high level preferences. For example, UI 2300 includes the categories "green", "fast", and "cheap" (with what is considered "green", "fast", and "cheap" varying from embodiment to embodiment). The categories shown in UI 2300 are selected only for the sake of illustration and may instead includes these and/or any other categories applicable to electric resource 112 charging known in the art. As shown, the UI 2300 may be very basic, using well known form controls such as radio buttons. In other embodiments, other graphic controls known in the art may be used. The general categories may be mapped to specific charging behaviors, such as those discussed above, by a flow control server 106.

Electric Resource Communication Protocol

Figure 9:
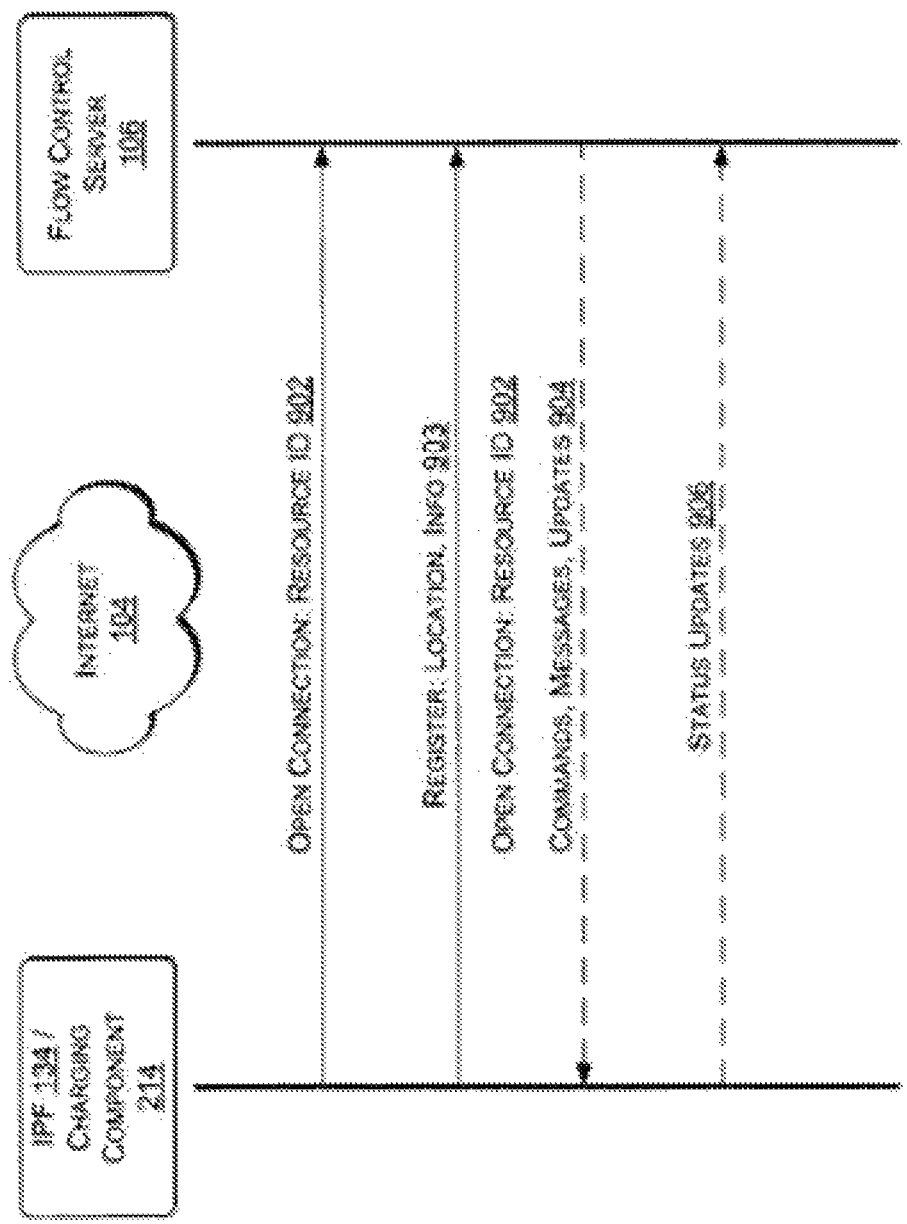
FIG. 9 is a diagram of an example of resource communication protocol.

FIG. 9 illustrates a resource communication protocol. As shown, a remote IPF module 134 or charging component 214 may be in communication with a flow control server 106 over the Internet 104 or another networking fabric or combination of networking fabrics. In various embodiments, a protocol specifying an order of messages and/or a format for messages may be used to govern the communications between the remote IPF module 134 or charging component 214 and flow control server 106.

In some embodiments, the protocol may include two channels, one for messages initiated by the remote IPF module 134 or charging component 214 and for replies to those messages from the flow control server 106, and another channel for messages initiated by the flow control server 106 and for replies to those messages from the remote IPF module 134 or charging component 214. The channels may be asynchronous with respect to each other (that is, initiation of messages on one channel may be entirely independent of initiation of messages on the other channel). However, each channel may itself be synchronous (that is, once a message is sent on a channel, another message may not be sent until a reply to the first message is received).

As shown, the remote IPF module 134 or charging component 214 may initiate communication 902 with the flow control server 106. In some embodiments, communication 902 may be initiated when, for example, an electric resource 112 first plugs in/connects to the power grid 114. In other embodiments, communication 902 may be initiated at another time or times. The initial message 902 governed by the protocol may require, for example, one or more of an electric resource identifier, such as a MAC address, a protocol version used, and/or a resource identifier type.

Upon receipt of the initial message by the flow control server 106, a connection may be established between the remote IPF module 134 or charging component 214 and flow control server 106. Upon establishing a connection, the remote IPF module 134 or charging component 214 may register with flow control server 106 through a subsequent communication 903. Communication 903 may include a location identifier scheme, a latitude, a longitude, a max power value that the remote IPF module 134 or charging component 214 can draw, a max power value that the remote IPF module 134 or charging component 214 can provide, a current power value, and/or a current state of charge.

After the initial message 902, the protocol may require or allow messages 904 from the flow control server 106 to the remote IPF module 134 or charging component 214 or messages 906 from remote IPF module 134 or charging component 214 to the flow control server 106. The messages 904 may include, for example, one or more of commands, messages, and/or updates. Such messages 904 may be provided at any time after the initial message 902. In one embodiment, messages 904 may include a command setting, a power level and/or a ping to determine whether the remote IPF module 134 or charging component 214 is still connected.

The messages 906 may include, for example, status updates to the information provided in the registration message 903. Such messages 906 may be provided at any time after the initial message 902. In one embodiment, the messages 906 may be provided on a pre-determined time interval basis. In various embodiments, messages 906 may even be sent when the remote IPF module 134 or charging component 214 is connected, but not registered. Such messages 906 may include data that is stored by flow control server 106 for later processing. Also, in some embodiments, messages 904 may be provided in response to a message 902 or 906.

Site Power Flow Manager

Modern electric vehicles benefit in a variety of ways from a centrally controlled smart charging program where a central server coordinates the charging activities of a number of vehicles. While many such smart charging programs may be operated by electric utilities to control electric vehicles over a wide area, many of the benefits of a smart charging program can be realized at a local level by the operator of a facility operating in isolation from the any other entity. In a place where multiple plug-in vehicles may park and connect to the grid, it is valuable to have site-level charging management.

Figure 10:
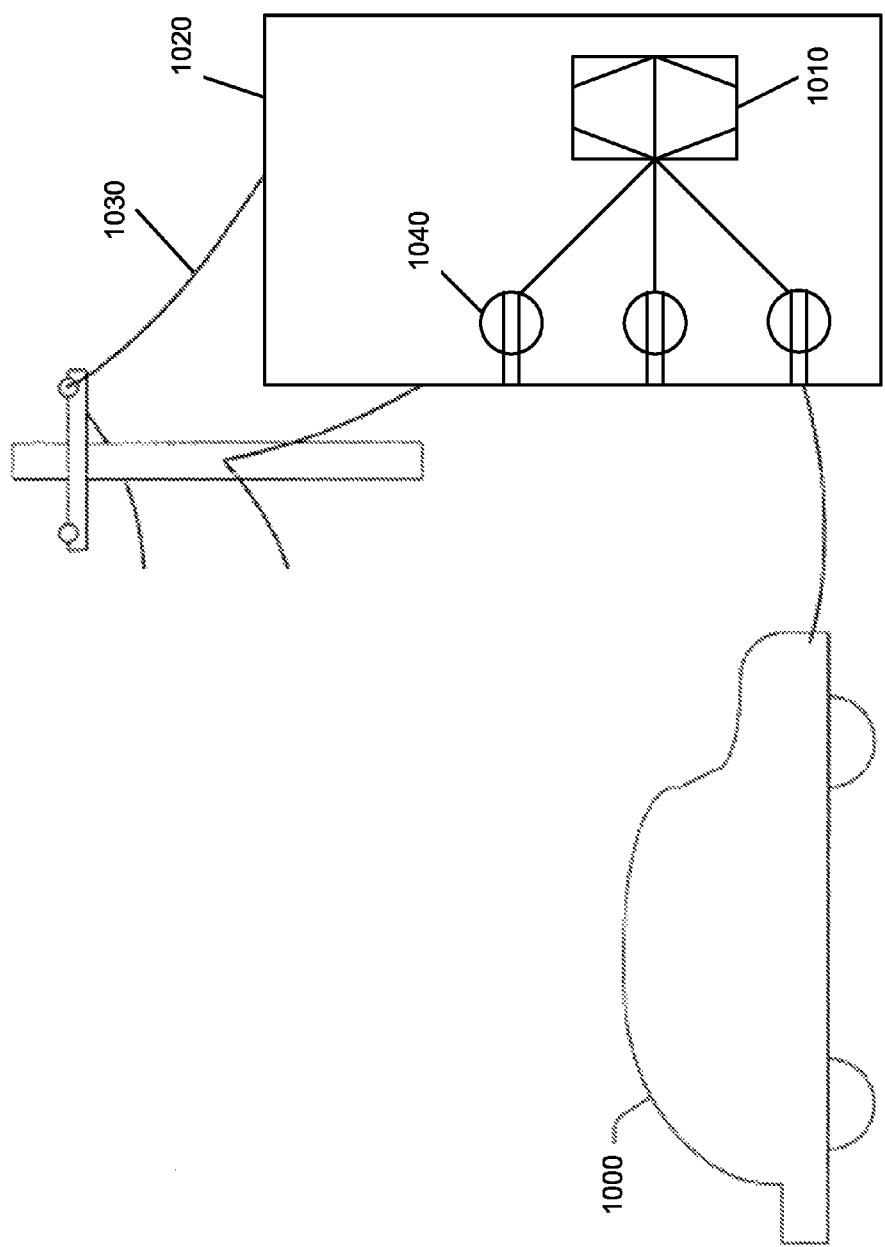
FIG. 10 is a diagram of an example of a site power flow manager.

As shown in FIG. 10, the charging process of electric vehicles 1000 is managed by a site power flow manager 1010 at the site-level 1020. Site-level charging management is an important feature at charging locations where multiple plug-in electric vehicles 1000 may park and connect to the grid 1030. Such locations/sites 1020 may include public or private parking lots, or the base of operations for a fleet.

There are a number of benefits for managing the power flow at the site-level. Having control over the flow of power is useful when, for example, the grid connection 1030 at the site 1020 is not capable of supporting every electric vehicle 1000, and/or other devices on site, that is simultaneously drawing power. In some instances, the wiring to specific charge points 1040 at the site, or to banks of charge points at the site 1020, may not be capable of supporting every vehicle 1000 drawing power at the same time. Many sites are subject to demand charges based on peak power draw during a time period (e.g. month), so avoiding power spikes can also save money. Furthermore, power usage can be tuned to the specific electric rate structure of the site.

A site power flow manager 1010 could address these issues, inter alia. Providing a power flow management system at the site-level allows important information to be taken as input, including but not limited to: electrical meter data for the site 1020 as a whole, and/or electrical meter data for specific charge points 1040 or banks of charge points. In addition, the system can consider information from devices, such as plug-in vehicles 1000, at the site that are connected to the electric grid 1030. Such information might be transmitted in a variety of ways, including by a power-line carrier or a wireless means. This information may include a unique identifier, resource type, current state of charge, and max power in/out levels. Further, the system can receive information about the electric rate structure of the site, and information about the electrical topology and power limitations of various circuits within the site. A connection to a power flow manager 1010 operates at a higher level of the grid topology, i.e. at the substation level or the control area level, so that the site power flow manager 1010 can receive information and also respond to requests, such as a demand response event, a reserves call, renewable resource following, or system regulation. In one embodiment, the site power flow manager 1010 and the higher level site controller can have priority rules, e.g. not overloading local circuits takes priority over remote requests.

A site power flow manager 1010 can analyze the current, and the predicted future, state of the world. In doing so, the site power flow manager 1010 can make various determinations, including whether or not to allow certain devices/vehicles 1000 to draw power. In addition, site power flow manager 1010 can request that the devices/vehicles 1000 provide power, and further control the power levels of the devices/vehicles 1000. These decisions could be made within constraints, such as not overloading a circuit or going over a certain total power draw. Such constraints may be performed, as in one embodiment, with prioritization, such as optimizing to get power to certain devices versus others. For example, the site power flow manager 1010 may charge vehicles 1000 that are at the lowest state of charge, that have been plugged in the longest, or that have priority for recharge. In an embodiment, the site power flow manager 1010 may allow for optimizing with regard to the overall site electric cost minimization or total cost minimization, or to recharge in the greenest, most efficient meaner.

Decisions made by the site power flow manager 1010 can be carried out in several ways, including controlling relays to open or close certain circuits. In addition, the site power flow manager 1010 can communicate with smart charging points 1040 or smart banks of charging points 1040 to control certain circuits or devices 1000 on those circuits. The site power flow manager 1010 may also communicate with the devices 1000 to give them a request or command for their power flow behavior, such as telling a vehicle 1000 to charge at half power or to recharge in an efficient manner. Such communications may traverse via a smart charging point 1040 or bank thereof. The site power flow manager 1010 may be located at the site 1020 being managed, but can also located remote to the site 1020.

Figure 11:
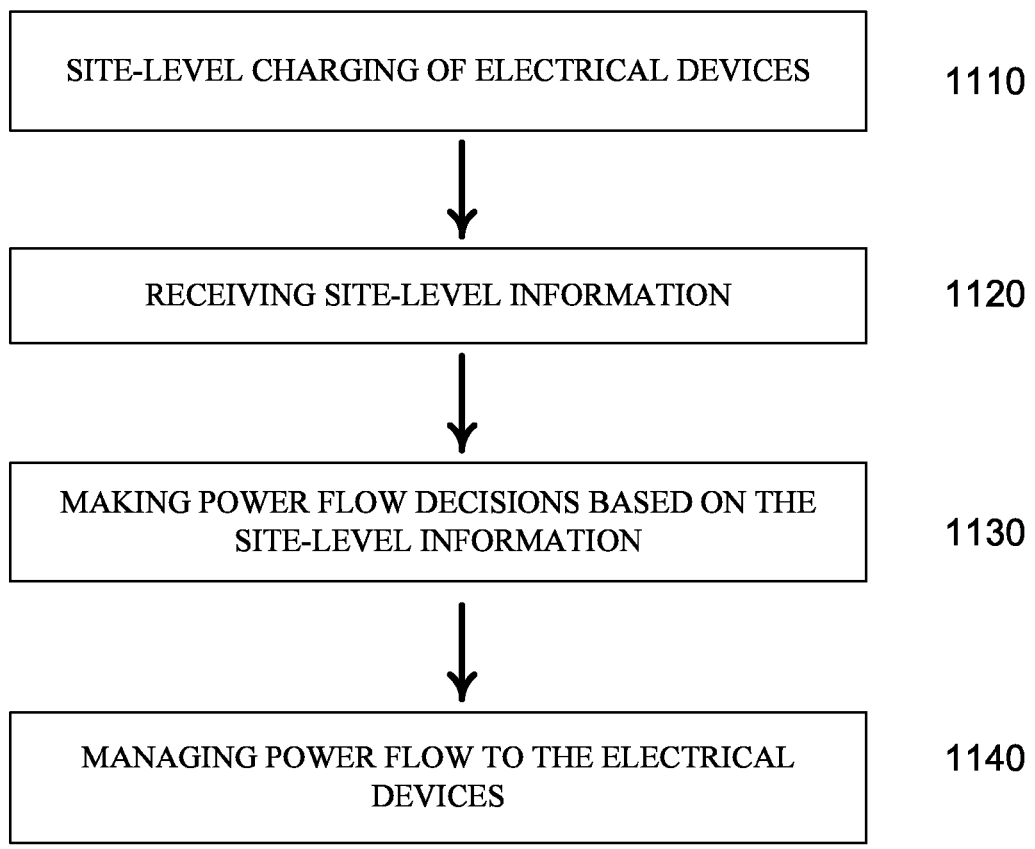
FIG. 11 is a flow chart of an example of a site power flow manager.

FIG. 11 illustrates the site-level charging of electrical devices by a power flow manager 1110. The power flow manager receives site-level information 1120, and makes power flow decisions based on the site-level information 1130. In addition, power flow to the electrical devices is managed by the power flow manager 1140, such that the power flow manager responds to requests including demand response event, reserves call, renewable resource following, or system regulation.

Meta-Optimization Across Multiple Power Flow Management Strategies

Managing one or an aggregation of power resources (such as load, generation, storage, plug-in vehicles), power flow manager can use the combined capabilities of the assets under its control to implement a variety of beneficial services. These services may include regulation, spinning reserve, and/or peak avoidance. Regulation involves increasing or decreasing the load present on the grid in real time in order to maintain balance between power production and power consumption in the entire grid. Spinning reserve provides the ability to quickly make up a large amount of missing power after the failure of a generation or transmission asset within the grid. Peak avoidance results in reducing peak power consumption for the day, which is typically the most expensive power for the utility to provide.

There are many other similar services, such as to provide capacity or to provide renewable generation following. As the power flow manager may use any number of different strategies to decide how to dispatch the resources under management, it will be understood by those skilled in the art that other strategies, and combinations thereof, may be implemented in various embodiments. In one embodiment, the power flow manager may be a site power flow manager 1010, as shown in FIG. 10.

Such services provide a substantial cost savings to an electric utility. In many circumstances, it is also possible for a utility or other operator to sell these services through an energy market. While each of these services have very distinct characteristics from the perspective of the electric utility, the services are each implemented in fundamentally the same way on the power resource endpoint. That is, by selectively flowing power in to or out of the power resource in response to commands from the central power flow manager.

Because the same pool of resources can be used to implement each of the possible services, a conflict arises. As an example, If an entire population of electric vehicles is committed entirely to regulation services, that population not be able to fully participate in a peak avoidance program. Because the relative costs and benefits of the various services change over time, it is undesirable to simply pick the most valuable service and commit all the assets to it all of the time.

Given a set of such strategies, a meta-optimizer decides which strategy to use at appropriate times. The meta-optimizer may be located within the power flow manager. The meta-optimizer determines which resources are to be used in implementing a strategy. The determination may be based on a variety of factors, such as maximizing value generated and/or minimizing environmental impact. In an embodiment, the meta-optimizer chooses the strategy that is likely to generate the most value for a given time period, e.g. the next hour. The implementation may have a value function associated with each strategy, and then take the maximum value across all strategies.

The decision may vary by grid topological location. For example, if a given feeder is overloaded, the best decision for resources on that feeder may be to reduce the load, even if elsewhere on the grid a different strategy or action may be best.

The decision may also take into account multiple component requirements. For example, in managing plug-in vehicle recharging, it may be desirable to get vehicles recharged in a timely fashion, while also maximizing value created through other services provided.

In one embodiment, the decision may be based on predictions about the future. For example, it may be worth a certain amount at hour N to take some action, such as charging plug-in vehicles to provide down regulation. However, if that means the resources might be unavailable at hour N+1, when the resource may be worth more than at hour N, then the meta-optimizer might delay the action so that the resource is available to provide more value.

Figure 12:
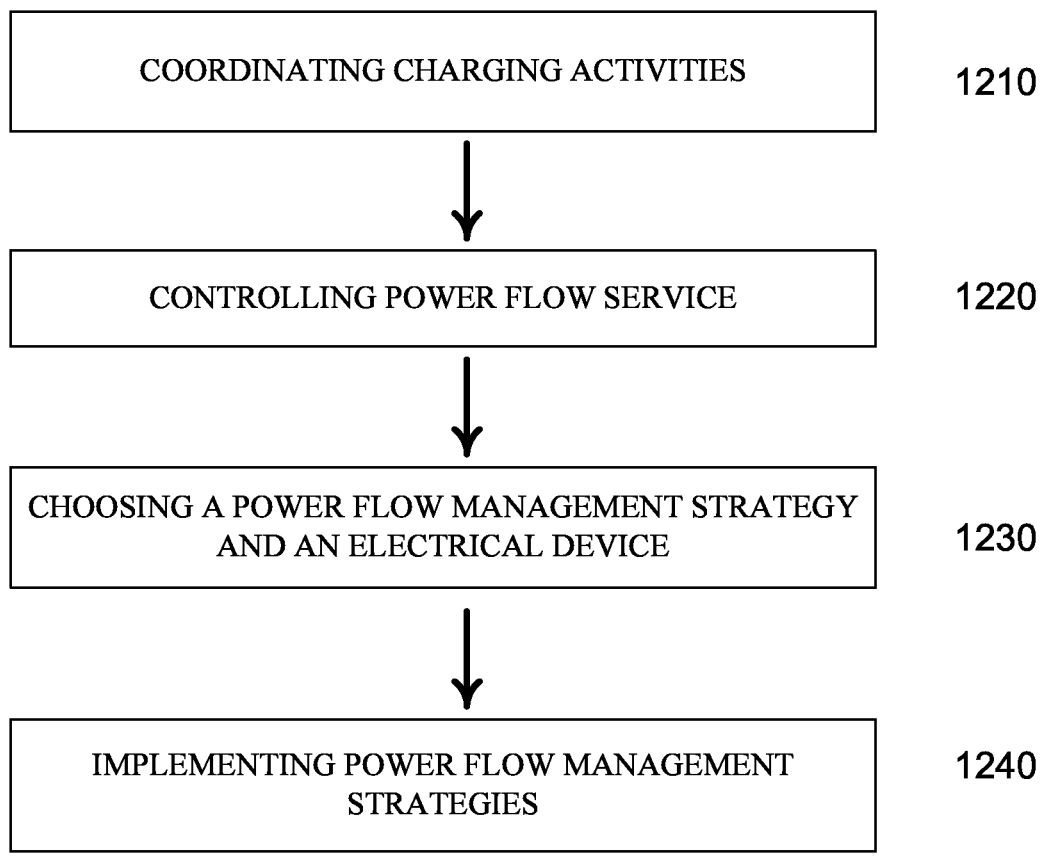
FIG. 12 is a flow chart of an example of optimization across multiple power flow management strategies.

FIG. 12 shows an embodiment of a method for managing power flow by optimizing multiple power flow management strategies including coordinating charging activities 1210 and controlling power flow service 1220. A meta-optimizer can choose a power flow management strategy and an electrical device 1230 such that the power flow manager may implement the power flow management strategies 1240.

Avoiding Power Spikes During Energy Management Failures

Historically, utilities had to depend on the independent and random nature of electrical loads on the grid. While an individual electrical load is unpredictable and can be switched on or off at any time, each load is only a small part of total power consumption. The large number of individual loads on the electrical system provides a form of smoothing. Electrical consumption increases and decreases over time, but the overall change fluctuates along a somewhat predictable curve and power companies are able to adjust power production to match consumption.

In distributed energy management systems where communications are not 100% reliable, it is important that no loss of communications between the elements of the system or unexpected system controller failure cause unexpected system behavior. One particular behavior to be avoided is an unexpected, coordinated action across distributed resources that results from a failure mode. For example, when a controller suffers a failure, it could be detrimental to the electrical grid if all distributed resources started drawing power from the grid simultaneously.

The introduction of a smart charging or energy management system causes otherwise isolated loads to potentially operate in concert. This creates the possibility of adverse coordinated action in the event of system failure. In particular, if each electrical load is designed to revert to a maximum energy consumption level in the case of communications loss, then a failure of the management system may result in an instantaneous and coordinated spike in electricity demand. When the population of controlled devices is sufficiently large, the spike in demand can exceed the utility's capacity for rapid adjustment and result in a blackout.

An example of a failure mode includes failed communications between individual resources and the master controller or controllers. Communications can also fail between a controller and some or all of the resources. In addition, a controller or a set of controllers can fail in a non-network related way that renders such controllers incapable of communicating with the resources. A failure mode may also be a design defect shared by a large population of resources causing the population to simultaneously lose communications capabilities when an unexpected event occurred.

In the case of any failure mode, the system behavior should be predictable and non-disruptive. To prevent disruptive impacts on the grid as a whole, endpoints normally controlled by a central energy management server may employ a variety of safe failure modes. A system for maintaining predictable behavior may include a distributed resource with various capabilities, including the ability to receive/enact a sequence of commands to be executed at one or various points in time.

An example of a safe failure mode includes maintaining stable (non-changing) behavior for a defined period of time around a failure event. For example, after communications is lost, an isolated EVSE can continue charging at the rate last specified by the charge management controller. After some period of time, the EVSE may slowly transition to a different autonomous strategy.

Another safe failure mode includes executing a pre-arranged behavior in the event of a failure condition. As an example, if a group of EVSE's was connected to a electrical circuit that was only capable of providing 70% of the combined maximum power draw of the group, each EVSE could be pre-programmed to operate at 70% of capacity in the event of communications failure.

Yet another safe failure mode includes executing state transitions in pre-arranged behaviors at the determined time offset by a random interval of time. As an example, EVSE's that are off when communications fail could wait a random amount of time between 0 and 30 minutes before powering on. This random startup causes the increase in power consumption to be spread over time, allowing the utility the opportunity to respond.

A safe failure mode may also include using predictions about resource behaviors, such as the comings and goings from the system, to further enhance the estimate of the state of the world. As an example, if an EVSE is normally commanded to consume power along a curve (to harmonize with grid conditions), the EVSE could be programmed to follow type-based typical curve in the absence of communications. Since the central smart charging system would know the curve the detached EVSE was following, its behavior could still be input in to the charge management algorithms.

Figure 13:
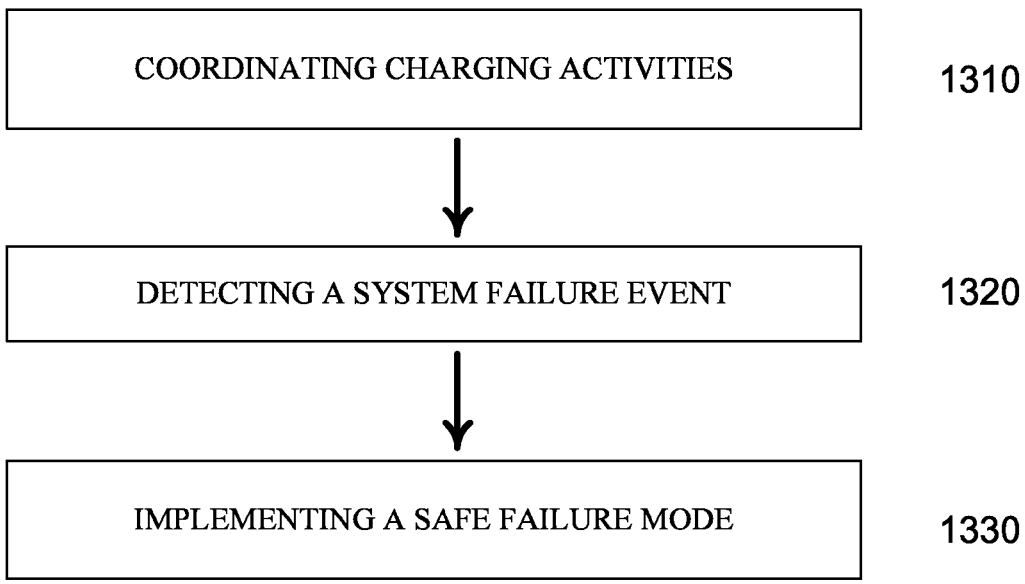
FIG. 13 is a flow chart of an example of avoiding power spikes during energy management failures using safe failure modes.

FIG. 13 illustrates an embodiment for managing power flow using safe failure modes including coordinating charging activities of electrical devices 1310 and detecting a system failure event 1320. The power flow manager implements a safe failure mode 1330 that provides predictable and non-disruptive system behavior.

Generation-Stack-Aware Dispatch of Resources

One potential goal of a distributed energy management system is to dispatch resources to minimize cost. A basic cost reduction strategy is to reduce electricity consumption when electricity prices are high. This basic strategy reduces the cost of electricity consumed by the endpoints under active management.

A more advanced strategy could manipulate the electricity consumed by controlled endpoints in a way that impacts the market price of power. Such a system can reduce the cost of providing power to all devices within a utility's service area, not just those under active management.

In many regions, power production is managed by separate entities from the utilities responsible for distribution. Utilities purchase electricity from Power producers, and re-sell it to their customers.

Often, the transactions between power producers and distribution utilities take place in formalized market. Such a market typically operates as a single price auction. In such a market, each power producer states the price at which they are willing to provide power, and power production is allocated to the cheapest producers first, moving up the stack to more expensive produces until sufficient power has been obtained. The last (highest) price selected set the price that all power producers are paid.

Each type of generation asset in an energy generation system, such as the electrical grid, has a marginal cost. Generation assets are dispatched in the order of increasing marginal cost. The most expensive generator dispatched at any time sets the cost basis for energy generation.

Different types of power plants have sharply different marginal costs of operation. For example, Hydroelectric is often much cheaper than gas turbines. As a result, there may be a sharp increase in the cost of electricity as available hydro is exhausted, and the gas turbines begin coming online.

At times, a distributed energy manager can remove enough load from the system to eliminate the need for higher cost generation, thereby decreasing the total cost to provide service.

The distributed energy manager can minimize the total daily cost to provide energy generation by forecasting total system and dispatchable load. The distributed energy manager schedules dispatchable load to draw power from the grid at times that will minimize cost based on the available generation stack. Altering the total price of power paid has a larger financial impact than the amount paid specifically for automotive power. Also, moving the market may be easier at one time of day than another. As a result, dispatchable load will not always be scheduled to the lowest-cost time of day, but rather when it will have the most beneficial overall effect to the utility.

Further, the generation stack can change from region to region, and load profiles and consumption can change daily. Therefore, the present method will produce different dispatch patterns in different regions.

Figure 14:
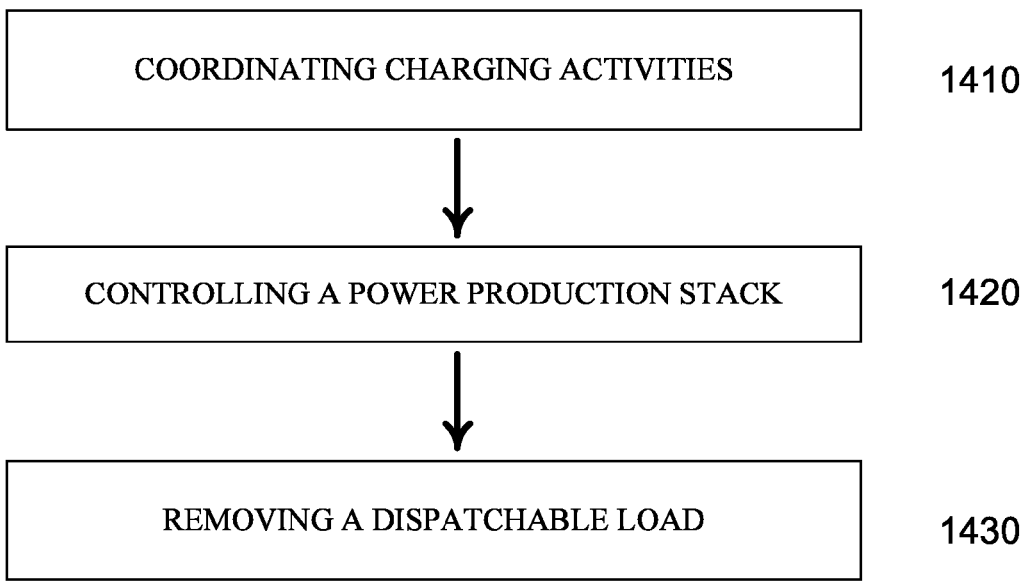
FIG. 14 is a flow chart of an example of generation-stack-aware dispatch of resources.

FIG. 14 shows an embodiment of managing power flow using generation stacks of power production to reduce cost of providing power to electrical devices. Charge activities are coordinated by a power flow manager 1410. A power production stack is controlled the power flow manager 1420 such that the power production stack orders available power. Based on a cost reduction strategy, a dispatchable load is removed 1430. The dispatchable load is listed in the power production stack.

Business Model of Selling Aggregated Power Resource Management Services to Power Generators or Others Power resource management services include aggregating the following: plug-in vehicles, thermostats, residential or commercial/industrial load, or fixed energy storage. Such services provide regulation, reserves, load shifting, renewable resource following, or peak avoidance. A power flow manager is able to provide a variety of services that can improve the stability of the electric grid. For example, electricity consumption of distributed resources can be increased and decreased as necessary to absorb the differences between electricity production and consumption on the grid.

Customers for aggregated power resource management services include electric utilities, ISOs, and TSOs. Such entities are primarily responsible for the stability of the grid. But aggregated power resource management services may be sold to various types of power generators.

Some classes of electricity generation suffer from a high degree of intermittency, meaning that their power production is irregular. By bundling this irregular power production with the smoothing/stabilizing abilities of aggregated power resource management assets, it is possible to produce a higher grade of wholesale power, which may be more easily sold in energy markets.

In one example, a wind farm is the buyer of aggregated power resource management services. Wind farms are susceptible to fluctuations in the supply and demand of energy. For example, prices for energy may drop drastically when the amount of wind is great, or unexpectedly high. In addition, wind farms may be temporarily disconnected from a grid when there is not enough transmission or other capacity to absorb the power.

Economical issues resulting from such instability in the supply or demand of energy can be effectively addressed by providing owners of intermittent renewable generation with aggregated power resource management services. Power generators may increase their net load from the aggregated power resources when there is a large and/or unexpectedly high amount of wind, and decrease net load with there is a small and/or unexpectedly low amount of wind.

In an embodiment, power generators can use aggregated power resource management to smooth sudden ramping events in power output, or to firm the power output to a desired level. The sum of power generation plus net load from the aggregated power resources can be made constant, or less susceptible to changes in the supply or demand of energy.

As a result, power generators such as power plants may retain the value of the energy they create. Such an integration allow the operator of the generation asset to take direct action to address the intermittency issues associated with their type of generation. In some markets, this may be far more desirable than waiting for other parties to provide such services through the marketplace.

AGC Virtualizer

An attribute of the electrical grid is that power production must always be closely matched to power consumption. As such, electric utilities predict power consumption in advance using a variety of techniques in order to schedule power production to match consumption. Because these predictions are never entirely accurate, the electric utility is left with a shortfall or surplus of produced electricity.

To address this mismatch between predicted and actual power consumption, utilities arrange for some power generation plant to operate in a regulation mode. This is sometimes called system regulation, or frequency regulation. In regulation mode, the power output of a power plant can be increased or decreased in near real time. In the event of a power surplus, the utility orders the power plant in regulation mode to decrease power production. In the event of a power shortage, the utility orders the power plant to increase power production. Not all power plants are capable of operating in this mode, and the power plants that are often incur increased costs while in this mode. Issues such as fuel efficiently and mechanical stress must be accounted for when figuring the cost of regulation mode.

A power flow manager can provide system frequency regulation via Automatic Generation Control (AGC) commands. As such, the system may appear to behave as an ISO/TSO or a grid operator, such as a power plant, even though it is not actually a power plant. The power flow manager coordinates the behavior of power resources, such as the following: load, generation, or storage. The power resources can include plug-in vehicles, fixed energy storage, loads such as HVAC, or other devices. The AGC commands can be translated by the power flow manager into commands to specific devices, or sets of devices within its pool, in order to achieve aggregate behavior across the set of resources that matches the AGC request.

In an embodiment, the AGC command can be transmitted to all power resources. The magnitude of the command can be divided up among the power resources in proportion to the power range of each resource, accordingly to one embodiment. For example, a command for 1 MW of down regulation can be divided up such that a device with a 2 kW potential power swing between max power in and max power out would be asked to provide half as much contribution as a device with a 4 kW potential power swing. More complex schemes can optimize dispatch based on a variety of factors, including: minimizing communication to resources; fairness; maximizing ability to provide services in the future, e.g. not filling up a plug-in vehicle that can only be charged; or, resource owner preferences or requirements.

AGC allows for regulation in two directions. Up regulation is a request for additional power, while down regulation is the request for a reduction in power. A power flow manager can implement bi-directional regulation (both up and down) using only power resources that are capable of unidirectional power flow. This is accomplished by setting a population of power resources to consume power at a rate less than their maximum (e.g. 50%), and then adjusting power consumption up and down in accordance with AGC commands. During periods of power shortage (resulting in up regulation requests), the power resources could curtail energy use and/or increase energy output. During periods of power surplus (resulting in down regulation requests), the power resources could increase energy use and/or decrease energy output relative to their initial rate.

Figure 15:
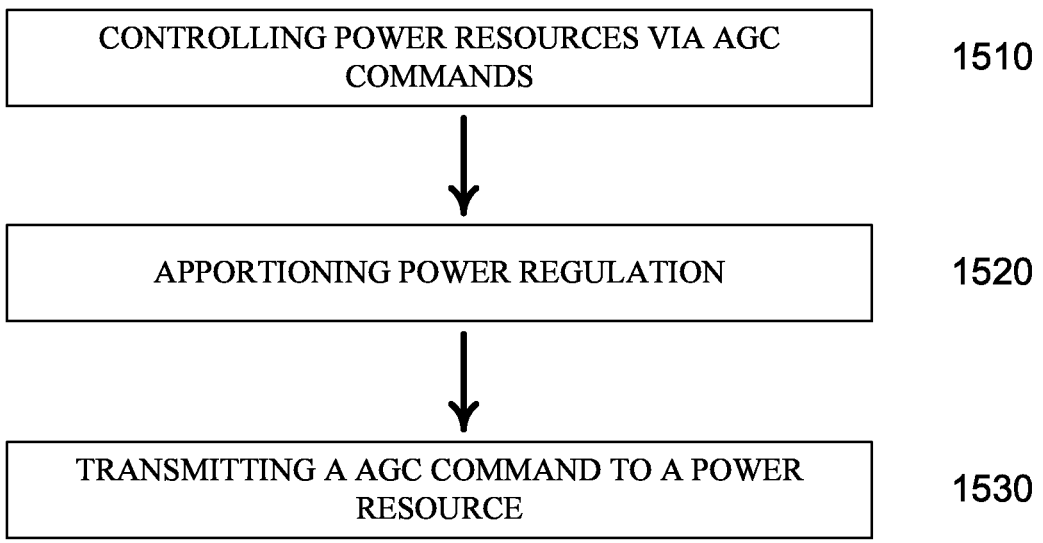
FIG. 15 is a flow chart of an example for AGC virtualization.

FIG. 15 shows an embodiment of power flow management using AGC commands to control power resources 1510. Power regulation is apportioned to the power resources 1520. An AGC command, which requests an apportioned amount of the power regulation, is transmitted to a power resource 1530.

AGC for Resources Beyond Generation

Automatic Generation Control (AGC) can be utilized to control power plants so that they may provide system frequency regulation. In an embodiment, a power plant might be scheduled to provide 30 MW of power during a certain hour, while also being available to provide 10 MW of down regulation and 20 MW of up regulation during that hour. As such, the plant output might vary anywhere from 20 MW to 50 MW. In an embodiment, AGC typically transmits a power level set point within this range, e.g. 37 MW, or may send relative power request, i.e. increase power or decrease power relative to the current level.

Given a load or energy-storage based power resource, or an aggregation of such power resources, system frequency regulation can also be provided by adjusting the net balance of supply and demand for energy. Energy storage in discharge mode can output power much like a generation plant. Load, or energy storage in charge mode, can consume power like negative generation. When a number of vehicles/resources are grid-connected and charging, an up regulation request can be serviced by temporarily reducing the rate of vehicle charge. Additionally, generation based power resources can be part of an aggregate of other load or energy-storage based power resources.

In one embodiment, AGC systems and protocols can be extended to handle power level set points that can be negative. As such, the power flow manager receiving the request can treat negative values as requests for energy consumption, and positive values as requests for energy production. When the AGC system does not support negative numbers, the entire power range can be shifted to start at zero, such that the shift amount becomes a separate load amount within the system. For example, a power range of −5 MW to 10 MW can be shifted to be 0 MW to 15 MW with the offset amount becoming a separate load amount of 5 MW.

Figure 16:
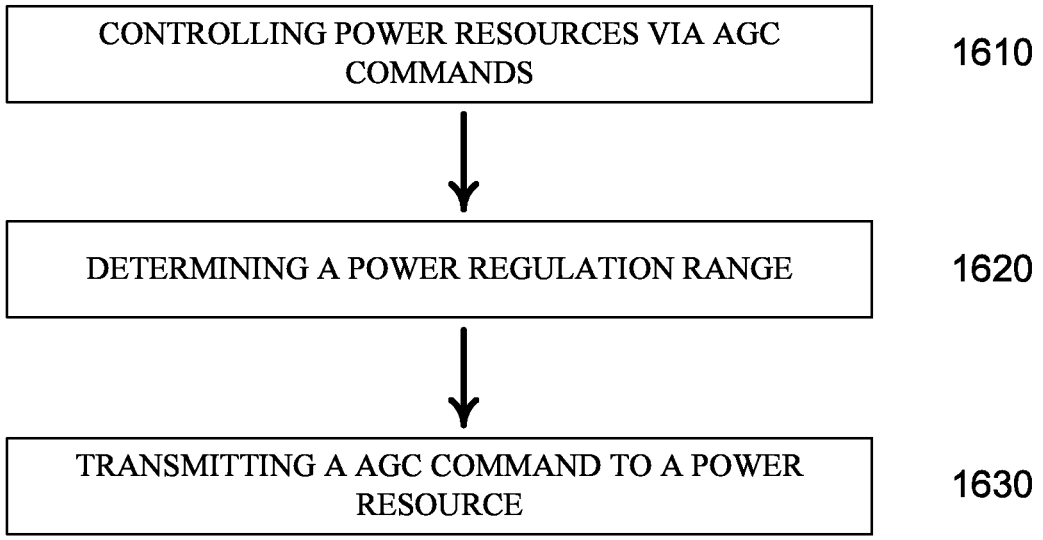
FIG. 16 is a flow chart of an example for AGC for resources beyond generation.

FIG. 16 illustrates an embodiment of power flow management using AGC commands to control power resources 1610 where a power regulation range for a power resource is determined 1620. An AGC command based on the power regulation range is transmitted to the power resource 1630.

Intermittent Generation Smoothing and Leveling

Intermittent generation resources, such as wind or solar, can suffer from sudden ramping up or down in output, as well as somewhat unpredictable output levels over time. For example, the wind speed or direction can shift rapidly or a cloud can temporarily obscure the sun over a solar generation asset. Since power production must always be closely matched to power consumption, it is very difficult to integrate unreliable generation resources in to the grid, particularly as the percentage of power being provided by such resources increases in the generation mix.

In some situations, utilities are forced to provision conventionally fueled standby power generation assets to provide backup to the intermittent generation resources. For example, natural gas turbines are often used in this way. Other rapidly adjustable generation such as hydro may also be used to provide this firming of intermittent generation. This substantially increases the real cost of renewable energy sources. To address these issues, a single power source or an aggregated collection of power resources can be controlled. Such resources may include load, generation, or storage.

In the case of unexpected drop-off in electricity production, managed power resources can reduce their electricity consumption. Power resources capable of reverse energy flow may also contribute electricity back to the grid. In the case of an unexpected spike in electricity production, managed power resources can consume the surplus electricity by increasing their rate of energy consumption, or by other means. A collection of power resources could be managed using at least two distinct strategies: smoothing and leveling.

In a smoothing method, the rate of change of power output can be limited. When a sudden increase or decrease in power production occurs, the managed power resources can be used to spread this sudden change over more time. As an example, a sudden drop-off in wind production from 10 MW to 0 MW could be spread out over 20 minutes (using stored power, deferred charging, and other shifts in net power draw), affording the utility additional time to locate replacement power sources or otherwise address the shortfall.

In a leveling method, the overall contribution of the generation resources to the grid can be balanced by the power resources to provide a desired level of net generation. In an embodiment, such methods are used when output from a wind farm falls below a desired level. A collection of aggregated resources, such as plug-in vehicles, are dispatched to absorb the power drop. Some of the plug-in vehicles are requested to stop charging, or to charge at a lower rate. With a sufficiently large and capable collection of distributed power resources, leveling could increase the reliability of renewables to the same level as conventional power sources.

In an embodiment, leveling may be more valuable than smoothing to an utility or other operator. However, leveling may require a large amount of reserve capacity relative to the amount of renewable energy being managed. Smoothing can provide substantial benefit while requiring a smaller population of distributed energy resources.

Figure 17:
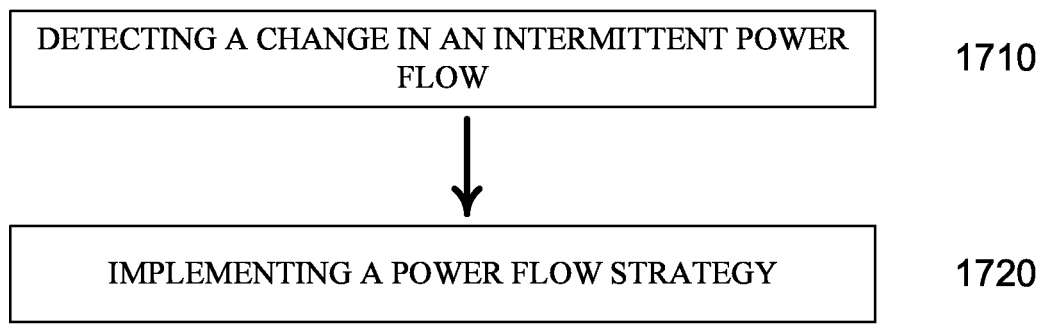
FIG. 17 is a flow chart of an example of smoothing and leveling intermittent generation.

FIG. 17 illustrates an embodiment of power flow management that detects a change in an intermittent power flow 1710 and implements a power flow strategy in response to the change in the intermittent power flow 1720. The power flow strategy may be a smoothing strategy or a leveling strategy.

Mobile Resource Locator

Referring back to FIG. 1, the exemplary power aggregation system 100 also includes various techniques for determining the electrical network location of a mobile electric resource 112, such as a plug-in electric vehicle 200 as illustrated in FIG. 2A. Electric vehicles 200 can connect to the grid 114 in numerous locations and accurate control and transaction of energy exchange can be enabled by specific knowledge of the charging location. Some of the exemplary techniques for determining electric vehicle charging locations include:

- querying a unique identifier for the location (via wired, wireless, etc.), which can be:
  - the unique ID of the network hardware at the charging site;
  - the unique ID of the locally installed smart meter, by communicating with the meter;
  - a unique ID installed specifically for this purpose at a site; and
- using GPS or other signal sources (cell, WiMAX, etc.) to establish a "soft" (estimated geographic) location, which is then refined based on user preferences and historical data (e.g., vehicles tend to be plugged-in at the owner's residence 124, not a neighbor's residence).

Location Determination Using a Network Fingerprint

The presently disclosed systems and methods can solve the problem of determining the location of a device with respect to a known location on the electrical grid or a known physical location (e.g. my home, my office) associated with a location on the electrical grid. Traditional approaches of using the Global Positioning System (GPS) or cellular tower based Location Based Services (LBS) are not sufficient. Limitations in GPS and cellular resolution make the precise determination of a location difficult, especially in cases where two locations are overlapping or in close proximity. When two locations are too close to distinguish and resolve their locations using GPS and/or cellular information, or in cases where GPS and cellular information is not available because of the lack of a transceiver or the lack of signal, the device described herein uses a collection of other communication based information to construct a network fingerprint of a known location that is subsequently used to determine whether a device is at a previously known or unknown location.

In one embodiment, the disclosed methods determine whether an electric car, or other electrical equipment such as a charging station that may be semi or completely mobile, has moved from one known location to another or otherwise left a known location. This is crucial when determining billing related matters; for example, when deciding whether to bill my home or my office for the electric power used or produced. It is also important to have knowledge about which devices are located on a network when establishing the overall load characteristics of a given area of the grid. In one example, such knowledge is useful in determining whether charging a device affects, or will affect, the overall load of my home neighborhood or my office neighborhood.

To address the issue of location resolution, a device may contain one or more communications adapters, such as Ethernet, Wi-Fi, ZigBee, Cellular, LBS, or GPS. The device may use some or all of these communications mediums in a combination of active or passive modes to extract information that is unique to a given location. Various techniques fingerprinting devices on a network may be combined to construct an overall fingerprint of the surrounding network as a whole.

Once a network location fingerprint is collected and stored it may be associated with a known location (e.g. home, or office, or parking lot space #12), or it may be assigned an otherwise random location identifier. The fingerprint may be stored in a database for later use when trying to determine a device's location.

The disclosed system can also take into account the dynamic nature of such information. A portion of the fingerprint may be expected to change over time. For example, the list of network peers may change as new peers are added or removed from the network. The MAC address of devices may change as they are replaced with new hardware. Host operating system information collected in IP stack fingerprinting may change as operating systems are upgraded. As such, the fingerprint of a location may change over time and the database can record the last fingerprint. The database may also record the entire history of fingerprints of a location in cases where the variation over time is itself useful in identifying the location. For example, a given home location may have three network peers in the evenings while various people are home from work with their networked laptops and phones, but may have only one peer during the workweek while they are at work. Depending on the time that the network location fingerprint is compared, this sort of dynamic information can be used to resolve the location name.

Pattern matching can be used to match one location fingerprint against another. Based on the statistical nature of the fingerprint, the disclosed system is capable of making a location determination in the presence of partial or changing fingerprints by applying any number of statistical methods, such as regression analysis, logistic regression, Bayesian, pattern matching, or ad hoc weighting of various parts of the fingerprint. For example, the likelihood that a given location will replace the communications gateway that a car would connect to (and thus a change in the MAC address present in IP traffic from the gateway) is probably low in comparison to the probability of adding or removing of peers to the same network.

In an embodiment, the disclosed method uses a process by which a device connected to a network can query network peers and collect and store a set of identification information, such as MAC address, IP address, and trace routes. The method may utilize other various pieces of information to construct a fingerprint of the device's current location such as ping latencies to gateways, other network peers, cell tower information, or GPS information. As such, the method constructs a location fingerprint that is the aggregation of various sources of information, and may further use a statistical model weighting the relevance of the various pieces of information. The information can be stored on a server or the device.

When a device subsequently performs the fingerprint process, the device can subsequently detect whether the device has changed locations by detecting differences in some or all of this set of information. Upon detecting that the device has returned to a known location, or that the device is at a new location, the device or a server can take certain actions. Such actions may include: notifying a user, notifying another server, initiating a configuration process, or operating in different modes.

According to an embodiment, a user plugs in a device to their home network, and the device scans for and records the MAC addresses of the user's router, home PC and printer. The device transmits this information to a server, such that a fingerprint is associated with the location. The user may move the device to a new location, e.g. the user's office. The device detects a different fingerprint from the MAC of a new router, and several dozen work computers. Another information relating to the new location is stored in the server so that the fingerprint is associated with the location. When the user returns the device to the home network, the device recognizes it is at home. The device can recognize a location even if some, but not all, of the fingerprint has changed. For example, a printer may no longer be present.

Figure 18:
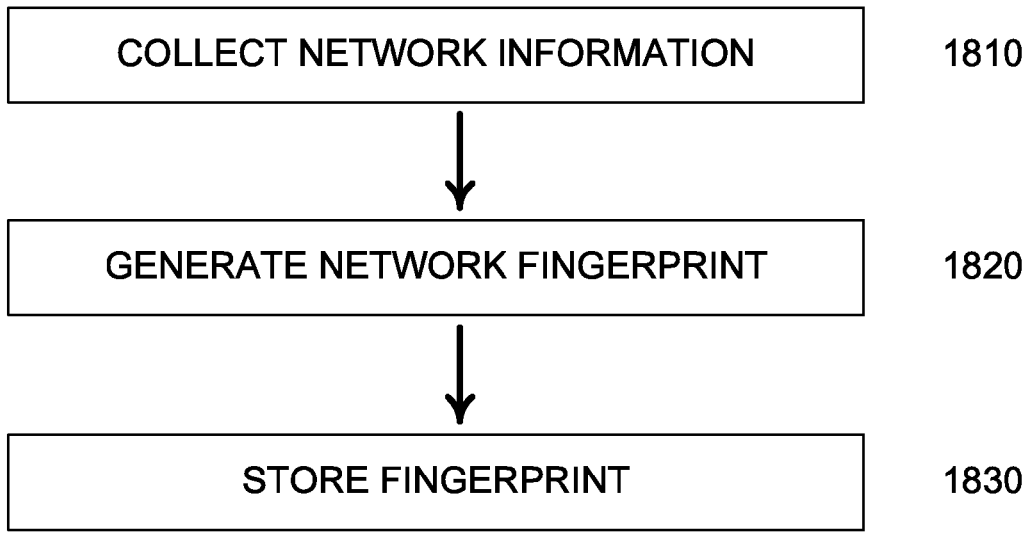
FIG. 18 is a flow chart of an example of fingerprinting a local network for a power management system, in accordance with the currently disclosed invention.
Figure 19:
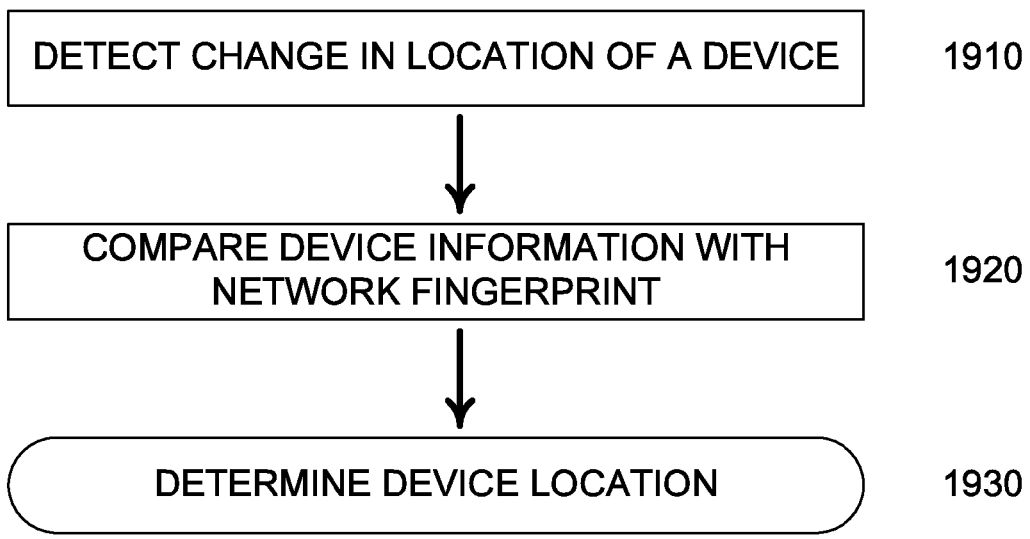
FIG. 19 is a flow chart of an example of determining the location of an electric vehicle using a network fingerprint.

FIG. 18 shows an embodiment of fingerprinting a local network for a power management system. Network information from devices, such as electric vehicles, is collected 1810 in order to generate a network fingerprint 1820, which is stored 1830 in a database. As shown in FIG. 19, according to an embodiment, a change in the location of a device is detected 1910 and compared with a network fingerprint 1920 in order to determine 1930 the location of an electric vehicle.

Accurate System Metering Via Statistical Averaging

Metering information for an aggregate power system from the endpoints requires a meter at each endpoint. A potential cost reduction for such system is to reduce the accuracy of each individual meter. Building a model for the meter error for each type of meter in a system provides an upper bound on system accuracy. Any bias, or offset from zero, can be removed from the system level calculation by utilizing such a model. Additionally, the standard deviation of the meter error can be characterized.

In an embodiment, the meter population can be characterized as 1,000 meters in the system being uniformly distributed over the range of +/−2% with a standard deviation of 1.15. The total system error is defined by the sum of the meter error terms. This error can be estimated by computing the standard error on the sample mean of the sampling distribution using the formula stderr=stdv/sqrt(N) which provides a standard error=1.15/sqrt(1000)=0.0364 in this embodiment. To maintain a certainty of 99% on this estimate, the error percentage estimate may be multiplied by 3 because, under a normal distribution, 3 standard deviations covers roughly 99% of the samples. This results in 0.1091% for the currently presented embodiment.

The implication of this observation is that even if our meter error is uniformly distributed within +/−20% with only 1,000 meters, the disclosed system can still achieve a measurement accuracy of +/−1.1%.

Aggregate System Power Flow Inference

A power flow management system is responsible for producing an estimate of the aggregate power flow to or a from a set of devices that are participating in system. By collecting individual power flow measurements from endpoints participating in the power flow management system and aggregating those measurements, the system produces an estimate for the aggregate power flow of the devices.

For the purposes of this disclosure, ESVE or should be understood to be Electric Vehicle Service Equipment, which is herein defined as a device that is a permanently installed piece of electric vehicle charging infrastructure that serves as an electric vehicle outlet. This type of equipment may include an energy meter.

For the purposes of this disclosure, aggregate power flow should be understood to be the sum of the power flows in a set of individual, distributed devices that are under the management of a power flow management system.

For the purposes of this disclosure, error bounds should be understood to be a limit on the magnitude of the error in the estimation of an aggregate power flow my a power flow management system. The error bounds on an aggregate power flow are specified with a level of confidence.

The devices that measure power flow at the endpoints of the systems (e.g. vehicles, homes, HVAC, EVSE) have non-ideal levels of measurement accuracy. That is, the power flow reported by the devices is the sum of the actual power flow and some amount measurement error (the error could be positive or negative).

By characterizing and modeling the measurement error of a class of devices, it is possible to produce error bounds for the power flow measurement of a population of devices by considering the device error model and the number of devices included in the computation.

Figure 20:
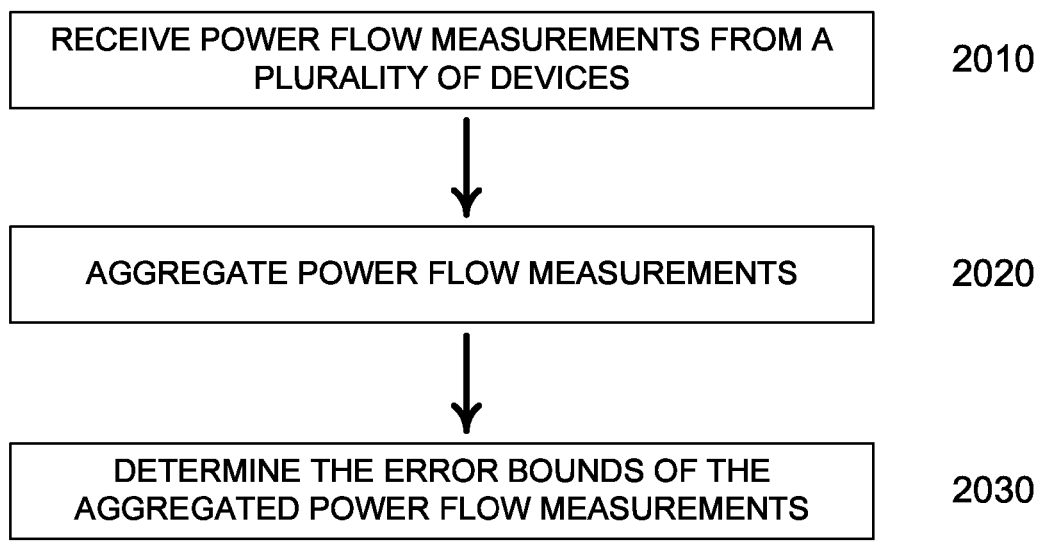
FIG. 20 is a block diagram illustrating a method for inferring an aggregate power flow for a power management system.

FIG. 20 illustrates a method for inferring an aggregate power flow for devices attached to a power management system. A plurality of power flow measurements are received 2010 from a plurality of devices, each device being associated with a power flow, each of the devices being capable of measuring the respective device's power flow within a measurement error. The plurality of power flow measurements are aggregated 2020, producing an aggregated power flow measurement. In one embodiment, the power flow aggregate for a set of devices can be computed as the sum of the individual measurements that are a part of the aggregate measure.

In one embodiment, the error bounds on an aggregate power flow measurement of a set of endpoints connected to a power flow management system can be additionally be computed. Making an assumption that the power flows at each individual device are independent and identically distributed (i.i.d.), the standard error of the aggregate power flow measurement can be computed by using the statistical definitions for i.i.d. random variables. That is, divide the error bounds of each individual device by the square root of the number of devices in the set to compute the standard error. The error on the aggregate power flow measurement is then bounded by multiplying the standard error by the number of standard deviations desired. For example, if a 95% confidence is desired, then the computed standard error value is scaled by 1.96 (the matching quartile for the normal distribution).

Power flow estimates can be produced for the entire system being managed by the power flow management system as well as for sub-parts (portions) of the complete system. Because the error bounds can be produced by an error model parameterized by the number of devices included in the computation, computing the error bounds for subsets of the device population requires adjusting the input (number of included devices) to the error model.

By modeling the measurement error in the measurement device at the endpoint, the power flow management system can compute the error bounds for the aggregate estimate of the power flow measurement at any point in the power flow management system.

This approach can support any meter error model and can even combine an arbitrary number of measurement error models. If the device type that performs the metering is known on a per-endpoint basis, it is possible to compute the number of instances of each device type contributing to the aggregate estimate. These individual devices counts are then used to feed the per-device-type model of error bounds.

In one embodiment, an error model for a set of devices of an identical type can be constructed. In one example of such an error model for a set of metering device, each individual device of a particular type is guaranteed to have all measurements within +/−N % of the true value.

In one embodiment, the error bounds of a subpart of the endpoints in a power flow management system can be computed. If it is needed to compute the error bounds for a subset of the endpoints under the management of the power flow management system, the standard error is computed by dividing the error bounds of an individual device by the square root of the number of devices in the subset. The error on the aggregate power flow measurement is then bounded by multiplying the standard error by the number of standard deviations we would like to capture in our estimate.

In various other embodiments, different error models are combined. One method for combining multiple error models (i.e. multiple types of power flow measurement devices) in the same power flow management system is to compute the weighted average of the error bounds for each set of devices described by a single error model where the weight is the percentage of total power measured by that set of devices.

Inferring AC Power Flow from DC Measurements

In a power flow management system, each endpoint device is responsible for reporting its own power consumption and production. In many cases, the endpoint device has sensors for measuring the Alternating Current (AC) power flow through the device (i.e. how much power the device is taking/delivering from/to the grid). However, some devices may not have the ability to produce accurate sensor data for the AC power flow of the device.

In cases where the device has other sensors that produce some information about the state and behavior of the system, it is possible to build an inference model for the AC power flow given the information for the other sensors. For example, in a battery charger, there may not be AC metering sensors, but their may be sensors that measure the battery's DC voltage and the DC current being used to charge it. If this additional information is available, then the battery charging device can be characterized such that accurate AC metering information can be inferred from the DC sensor readings.

Figure 21:
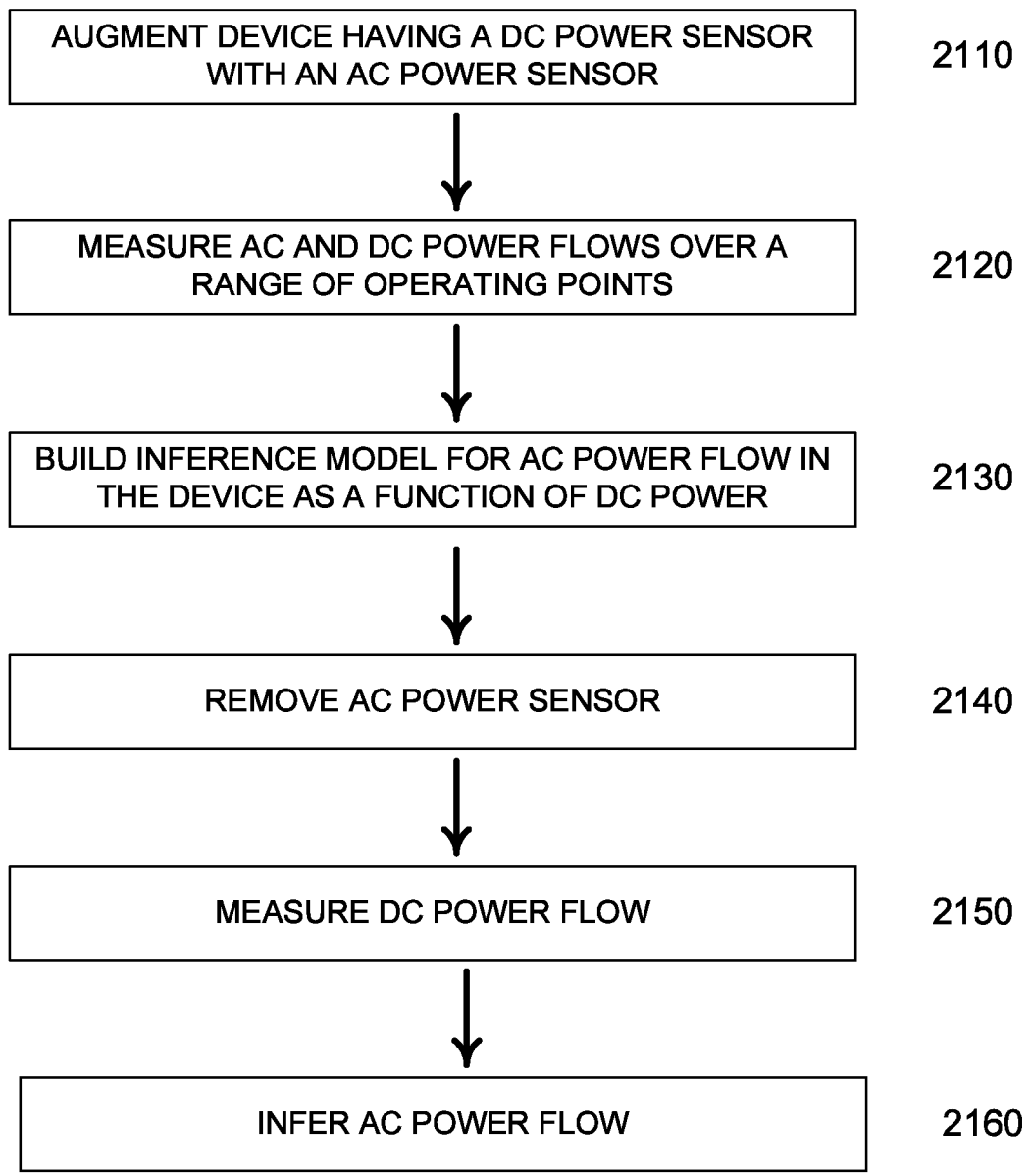
FIG. 21 is a block diagram illustrating a method for inferring AC power flow in a device from DC measurements.

FIG. 21 illustrates a method for inferring AC power flow in a device from DC measurements. A device having at least one DC power flow sensor is augmented 2110 with at least one AC power flow sensor. AC and DC power flow is then measured 2120 over a range of operating points. The power flows are then used to build 2130, using at least one computing device, an inference model of AC power flow in the device as a function of DC power flow, wherein the error of the model is bounded. The AC power flow sensor can then be removed 2140 from the device. DC power flows through the device can then be measured 2150 and used to infer 2160 the AC power flow for the device using the inference model and measurements from the at least one DC power flow sensor.

By augmenting a single device with AC metering sensors, it is possible to build an accurate inference model by gathering AC and DC sensor information for the devices, developing a model that produces the inferred AC metering outputs given the DC measurements, and bounding the error of the model and inference outputs. With this model in place, it is possible to apply this model to the DC readings of other similar devices to infer the AC power flow information of these devices without augmenting them with AC metering sensors.

If a set of devices is available, augmenting each of them with AC metering sensors enables the construction of a set of inference models for AC power flow from DC sensor information. Using this set of information, it is possible to construct a single model and its error bounds when applied to any of the devices in the set.

Consider a battery charging system that contains a battery charger and a rechargeable battery. When the battery charger is plugged into the grid, it is capable of charging the battery by passing DC current into the battery. This system is able to sense the DC (direct current) battery voltage and current directly. However, this system does not require or have AC power flow sensors.

To build an inference model for the AC power flow in this battery charging system, the system can be temporarily augmented with AC power flow sensors. By taking readings from the DC voltage, DC current, and AC power flow sensors for a broad range of operating points of this system, enough data can be collected to build a model of the AC power flow as a function of the DC current and voltage.

One such model may be a linear regression that scales some constant, M, by the DC power (DC voltage times DC current) plus some fixed offset, B. Given the full set of readings for AC power, it is possible to calculate the values of M and B to produce an approximation of the AC power from the DC power.

Bandwidth Minimization Techniques

A distributed energy management system must be in constant communication with the distributed energy resources to maintain a high level of certainty that the system is behaving as reported. Sending messages between the energy management system and the distributed energy resources is expensive because each message has a cost associated with it. Minimizing the number of bytes sent between the system and the resources will minimize the communications cost of the system. Accordingly, the consumption of network bandwidth is reduced.

Bandwidth, as used herein, can refer to network bandwidth. Bandwidth is the number of bytes per second of data traffic that flows into or out of a device or control system. Devices managed by the power flow management system can be any load, generation, or storage asset. Storage assets can comprise batteries and bi-directional power electronics such as inverters and chargers. Load assets may include water heaters, plug-in electric or plug-in hybrid electric vehicles, water heaters, generation facilities, or other controllable load, storage, or generation asset.

The disclosed system and methods can provide for the minimization of network traffic consumption in a system that manages the power flows to and from devices connected to a power grid. This power flow management system communicates with the devices, and can be centralized or decentralized. Through this communication, information about power flows is communicated to devices and information about device behavior and status is communicated to the system.

The system communicates with the devices to instruct devices as to when and at what rate energy should be taken from and delivered to the grid. These commands enable the devices to consume or produce energy when doing so is deemed optimal by the power flow management system.

The instructions that are delivered to the devices by the power flow management system can take many forms. One form of instruction is a direct command to flow power immediately at the requested level. Another form of instruction is a schedule of power flow that should be followed by the device and can take many forms. A schedule can indicate a single point in time at which a power flow level should be activated. A schedule can indicate a sequence of power flow levels that should be activated at various times in the future. The schedule can be repeating on a dynamic or fixed pattern, e.g. repeat a set of actions each day, each week, etc.

The devices also communicate information to the power flow management system about the current state of the world at the device. Information that can be transmitted for the benefit of controlling power flows includes information about how much power is currently flowing through the device and in what direction, capacity information pertaining to the resource (e.g. storage state of charge, fuel level of a generator), faults and error messages, presence of a resource (e.g.: electric vehicles come and go; is the electric vehicle currently available), scheduling constraints (e.g. how long is the resource available), energy consumption in a period (e.g. kWh consumed/produced in the last time period), etc.

Sending messages between the power flow management system and the devices requires the sending of data bytes across a network, which consumes network bandwidth. Because many communications costs can be directly measured by the number of bytes transferred to and from a device, minimizing the transfer of bytes between the device and the power flow management system minimizes the communications costs and consumption of network bandwidth.

A power flow management system can perform in a more efficient manner when it has complete information about the state of all of the devices under its control at all times. To realize this level of information awareness requires all assets to communication all information pertaining to the power flow management system in a timely fashion. Such a level of information communication comes with an associated cost.

There are a number of techniques that can be used to reduce the network traffic consumption in a power flow management system to reduce the cost of communicating with the distributed assets. Such techniques include the following: data compression, data overhead reduction, action/schedule pre-distribution, minimum change dispatch, communication of all status changes, configuration limits on relevant behavior, and non-time-critical information bundling. These bandwidth minimization techniques, and embodiments thereof, are further described below.

Data Compression. One of the techniques for minimizing bytes between the system and the distributed resources is data compression within a message. Compressing the data that is sent between the power flow management system and the distributed devices can reduce the total network traffic consumption.

A power flow management system that communicates with devices can send compressed messages to save on network traffic. One manner in which this works is to have both the power flow management server and the device use a compression algorithm or library (such as zlib or gzip) to compress data before transmission and to decompress data after transmission.

Reducing Data Overhead. In one technique, more bytes are included into a single message in order to reduce per-message overhead. Because each network message has some associated overhead, it is beneficial to put more data into a single message to reduce the network consumption on overhead traffic.

A device that is part of a power flow management system may collect data from its sensors and internal processes. For the bits of data that are not time critical to the system, the device can cache the data until the ratio of data to overhead is less than 5%. In the case of TCP/IP, this means waiting until the device had gathered 1280 bytes of data before sending.

Action and Schedule Pre-distribution. For complicated or long sequences of actions, these actions can be pre-distributed to the devices (or distributed one time over the network). When any of the pre-distributed actions need to be communicated, an identifier for the more complicated sequence is all that needs to be communicated. For dispatching actions or sets of actions, pre-compute large sets of actions can be directed using an action identifier. As such, the action sets are coded and only the code is transmitted. While this method consumes memory on the client and server, bandwidth consumption is reduced.

To achieve an application-level data compression, a power flow management system can define a set of compact messages that represent a pre-defined set of functionality. For example, consider a device that runs just 4 distinct schedules during its normal behavior. Rather than send the schedule that the device should run each time the behavior should begin, the power flow management system can send the device each schedule just once. Subsequent times that each of those four schedules need to run, the power flow management system can indicate which of the four schedules to run (by name or ID), and a substantial amount of bandwidth can be saved.

Minimum Change Dispatch. Another technique for minimizing bytes between the system and the distributed resources includes dispatching resources in a way that minimizes the total state change on a per-resource basis within the system. In one example, as few resources as possible communicate in order to effect the desired change within the system. Each time that the power flow management system needs to change the state of the distributed devices (e.g. now there is a need for 15 MW of power flow in some part of the grid, where the earlier needs was for only 13 MW), it can choose to achieve the targeted power flow by looking for the minimum number of changes in the system (e.g. a device that was off needs to be on or vice versa) that satisfies the constraint. In one embodiment, techniques use a single bit to toggle from one state to another, such as from off to on and from on to off.

There are many different algorithms that a power flow management system can use to determine which of the connected devices should be at what power flow level at any point in time. Should the power flow management system need to revise the net aggregate behavior of the power flow management system, it will likely need to communicate with some subset of the connected resources to signal a change in behavior.

One measure of the quality of a particular set of device change orders is how many of the resources need to be contacted to enact the change. One algorithm for achieving the minimum change set to achieve the system-wide power flow goal is to find resource for which a power flow change in the required direction is possible, and to then sort the devices by the amount of power flow they control. Starting with the device that controls the most power, work down the list of available devices until enough power has been recruited to achieve the goal of the power flow system.

Devices should communicate all status changes. This technique does not use application level pings. In the case of any change in device status (e.g. power level change, fuel level change by some interesting quantity, resource arrived/departed where resource may be a vehicles), communicating all such status changes eliminates the need for the power flow management system to use application level pings (i.e. messages from the power flow management system, which has the purpose of asking the device "Are you there?").

In one embodiment, the implemented technique provides that resources communicate their departure from the system. This enables the removal of all application level pings from the system. This also requires that the resources have the ability to maintain power for enough time after being disconnected that they can communicate. When there is a local communications controller, the controller can indicate the disappearance of a resource to the system.

Configurable limits on interesting behavior. Another bandwidth minimization technique involves increasing the tolerance limits for state changes that require notification of the main system. Relevant information should be communicated to the power flow management system in real time. The devices should support the ability to increase and decrease the limits of interesting behavior to make the network traffic consumption be tailor-able against responsiveness (e.g. knowing each time the power flow changes by 3% is more informative than if it changes by 10% but requires network bandwidth to communicate).

Non-time-critical information should be bundled. Techniques may minimize message overhead by saving data that is not time-sensitive for same-message transmission with data that is time sensitive, thereby saving the messaging overhead and enabling data compression on a larger message. For information that is not time critical to the operation of the power flow information system (diagnostic data, logged data, summary statistics, etc), the devices should gather this information in memory and only transmit it to the power flow management system when a sufficient amount of information is collected such that the portion of the message dedicated to overhead is small.

Various combination of the bandwidth minimization techniques may be implemented in an embodiment. For example, devices may communicate all interesting changes to the power flow management system and the limits defining interesting behavior for the device may be configurable. A power flow system that is fully informed and frequently updated about the behavior of the endpoints that are connected to it defines one endpoint on a continuum of control and flexibility. On the other end of the spectrum is a power flow management system that has little or no visibility into the behavior and status of the devices connected to it.

To enable the most flexible power flow management system while minimizing the use of network traffic, the system can establish criteria for devices that triggers an update action of status to the power flow management system. This way, only when something changes in the status of the device does communication need to be made. Such a scheme does not waste network traffic having devices inform the power flow management system that things are unchanged from the last communication.

For example, consider a battery charging device that is connected to a battery and participates in the network of the power flow management system. Once the device has connected to the power flow management system and reported its power flow (e.g. 800 W), there is no need for the device to report new information to the power flow management system unless there is a change in status. For example, if a device is reporting the amount of power flowing into a battery that is being charged and the battery fills up and does not require further charging.

Figure 22:
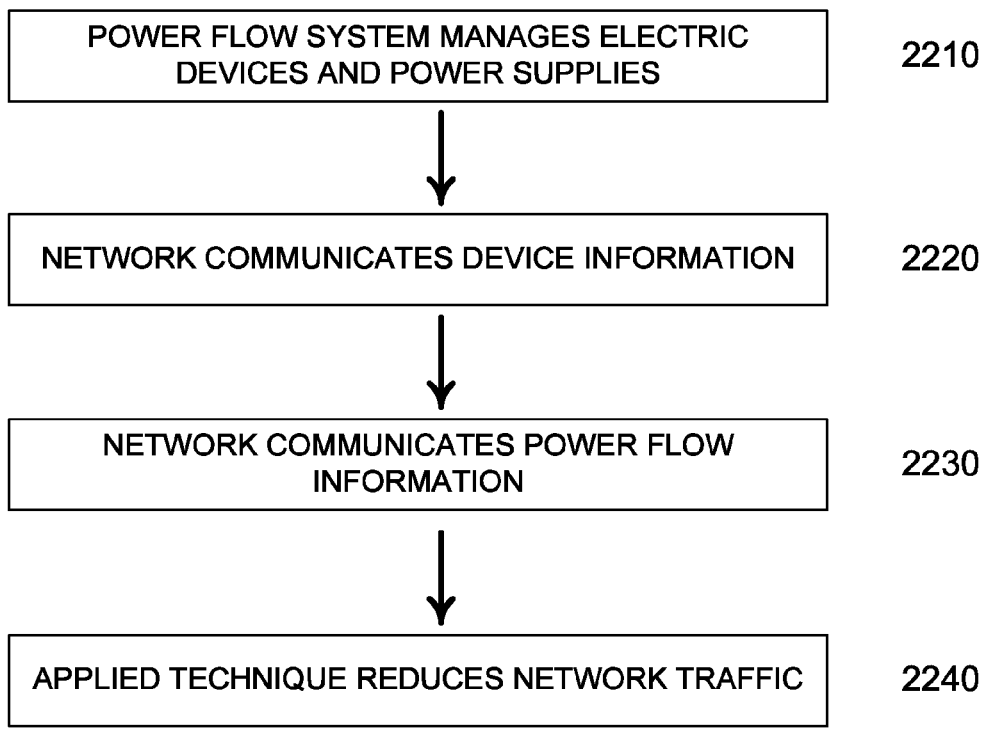
FIG. 22 is a flow chart of an example of a bandwidth minimization technique.

FIG. 22 illustrates an embodiment of a bandwidth minimization technique. A power flow management system, which manages electric devices and electric power supplies 2210, communicates device information 2220 and power flow information 2230. Bandwidth reduction techniques described above are applied to reduce network traffic 2240.

Smart Energy Protocol Translation Device

A protocol translation device may be provided that fully participates in two or more networks using physical signaling mechanisms that are capable of communication with each network. Messages are reformulated messages such that the messages can pass from one network to another. Since two relevant protocols may not be compatible, such a device passes high-level information as opposed to binary packets. This method is distinct from the method used by Internet routers that simply forward messages from one network to another without modification.

A Power Line Communicator (PLC), such as a power line carrier, is a signaling mechanism by which a high-frequency signal is added to the AC power line in a home or business. The high-frequency signal carries information in a variety of protocols to other devices that are able to decode these high frequency signals.

The protocol translation device may include the following: a microprocessor and power supply; physical transceivers for each supported communications protocol stack; a software stack capable of decoding messages from each of the communications protocols; and, a software/hardware layer that can translate, if necessary, and re-encode messages from one communications protocol to another communications protocol. Because modern home networking technologies can be wireless or PLC based, the protocol translation device need not be located near any device that it provides translation services for. The protocol translation device can be attached to any outlet in the home, such as wall outlet 204 illustrated in FIG. 2A. The protocol translation device can stand alone or co-reside with a device on the network.

In an embodiment, a device acts as an information bridge between two networks. An electric vehicle service equipment (EVSE), or a charge point, may communicate with an electric vehicle via the SAE J2836 application protocol over a HomePlug AV physical communication mechanism and with a home area network (HAN) using smart energy application protocol over a ZigBee wireless physical communication mechanism. Such an EVSE or charge point can implement the message translation between the two networks. For messages that have equivalent meanings in both networks, the EVSE can reformulate the message that comes in from the ZigBee/Smart Energy network to the format of the J2836/PLC network and transmit the message from the HAN to the vehicle.

In another embodiment, the device is a member of two different networks and the device passes messages back and forth between the two networks. The networks have some incompatibility, such as a physical layer or application layer. Smart energy is an application layer protocol that is implemented for multiple physical interfaces including ZigBee and HomePlug PLC. The device can be located such that it is able to participate in both networks simultaneously. The device may contain the physical equipment to be able to send/receive messages on either network, such as ZigBee for wireless and HomePlug PLC for wired. As a message is observed on either network, the device translates the message to the other network's physical layer. When both networks implement smart energy, there is no need to translate the application layer as well.

In one embodiment, an electric vehicle service equipment (EVSE) can act as such a translation device. When a vehicle has the ability to communicate via one protocol, and an EVSE is located where access to the central charge management server is provided by a different protocol, the EVSE could act as a translator between the two protocols. Such an EVSE includes complete implementations of both the hardware and software necessary to support both protocols to fully decode each protocol to obtain the application level messages.

An EVSE can be connected to a vehicle using the SAE2836 protocol over PLC and can be connected to a home network using a wireless ZigBee protocol, according to one embodiment. The EVSE can include complete implementations of each hardware and protocol stack. As such, the EVSE can forward messages between the two stacks.

In an embodiment, the translation device could be physically distinct. For example, in an installation with a PLC based vehicle and a wireless internet access point, the translation device can be a self-contained box plugged into a power outlet.

Figure 23:
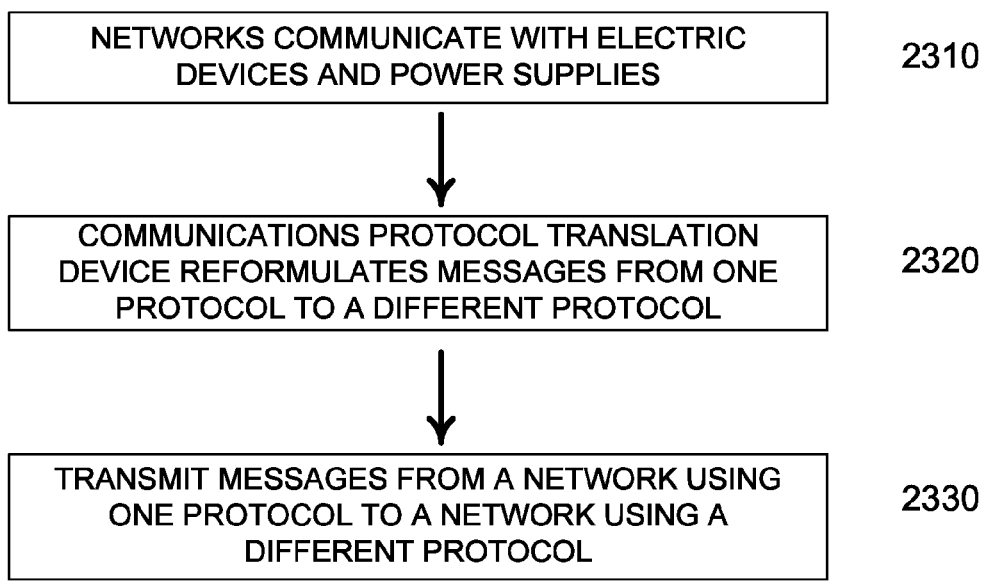
FIG. 23 is a flow chart of an example of a protocol translation system.
Figure 24:
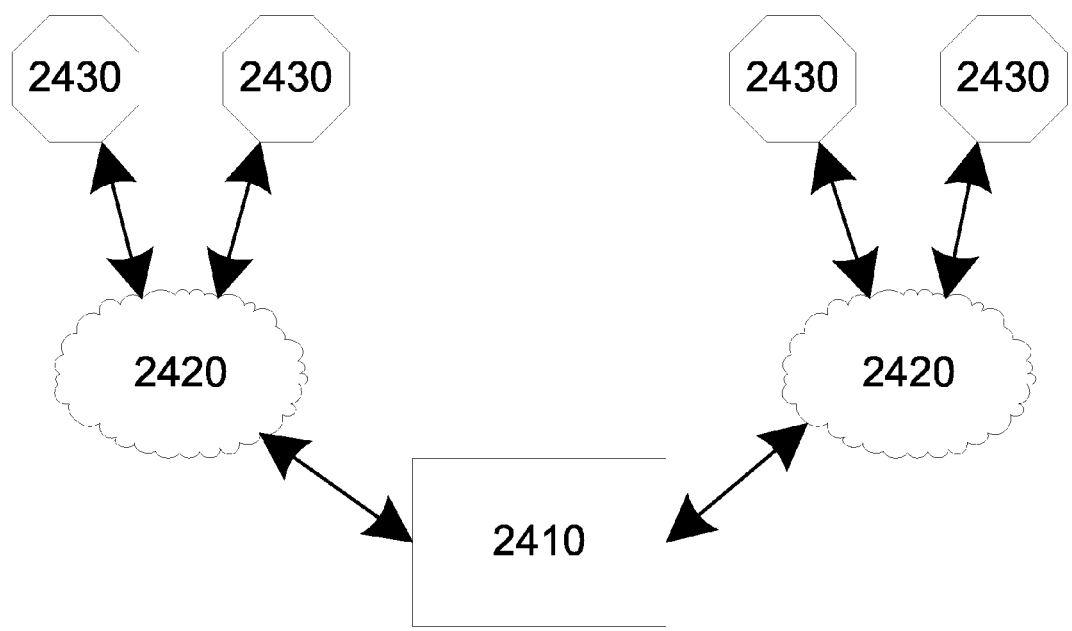
FIG. 24 is a block diagram of an example of a communications protocol translation device.

FIG. 23 illustrates an embodiment of a protocol translation for a power flow management system that utilizes networks to communicate between electric devices and electric power supplies 2310. A communications protocol translation device reformulates messages from one protocol to another protocol 2320 in order to transmit such messages from a network using one communications protocol to a network using a different protocol. FIG. 24 shows a communications protocol translation device 2410 implemented between two networks 2420 that are connected to electric power supplies and electric devices 2430.

Communications Utilizing Existing Hardware

Certain automotive subsystems, such as battery charge controllers, require real-time communications links to off-vehicle networks. The communications hardware to provide this off vehicle link includes Cellular, Wi-Fi, ZigBee, and Homeplug. Such equipment is expensive and can be difficult to configure.

Subsystems in a vehicle are connected together over a shared bus, known as the CAN-bus. This bus provides high-speed low-latency communication to attached devices, but does not provide the mechanisms necessary for communicating with off-vehicle entities. Rather than implement communications hardware directly, a client subsystem issues commands over the CAN-bus to request off-vehicle communications services from another "server" subsystem.

Existing subsystem in the vehicle that already possess communications hardware can perform this server role without requiring any additional hardware. Because the CAN-bus does not support routing or packet forwarding, it is necessary to define an encapsulation mechanism to permit the off-board communications protocol to be embedded within CAN messages.

In some circumstances, vehicle designs may include existing communications hardware for purposes other than charge management. These other uses may include emergency response and remote vehicle diagnostics. Rather than adding additional communications hardware, an electric vehicle can make use of these existing communications modules. Such module re-use is accomplished by enhancing the software on the existing communications modules in order to expand functionality.

Similar to modules installed via an extensibility mechanism, preexisting modules upgraded through software can engage in smart charging through two distinct mechanisms.

In one embodiment, the software upgraded communications module provides a communications path to external networks which allows vehicle modules to participate in a smart charging program in a manner similar to that of a vehicle that is initially equipped with a communications module.

In another embodiment, the software upgraded communications module includes all smart charging logic. In this embodiment, the software upgraded communications module is solely responsible for participating in the smart charging program, and then implements that program by sending primitive messages to other subsystems in the vehicle.

Figure 25:
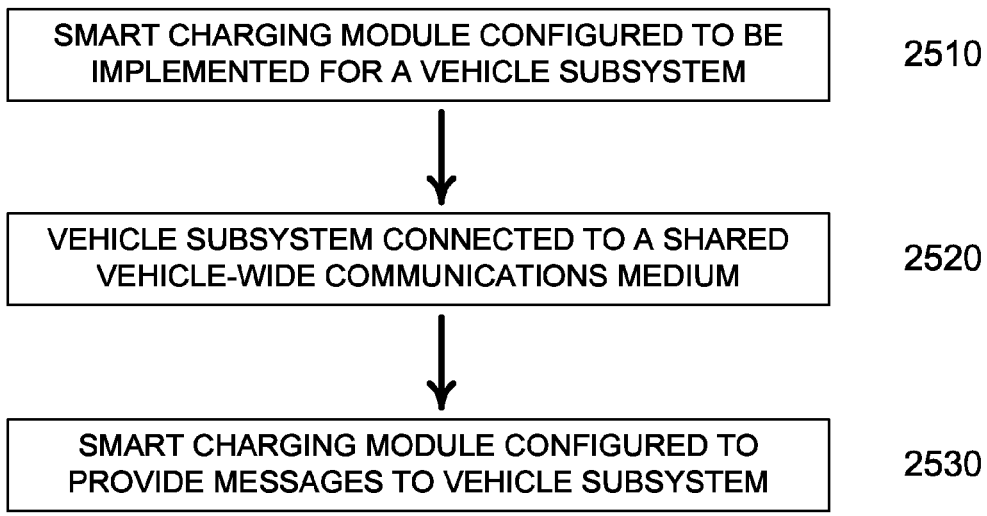
FIG. 25 is a diagram of an example of communications using existing hardware.

FIG. 25 illustrates an embodiment of communications using existing hardware with a smart charging module configured to be implemented for a vehicle subsystem 2510. The vehicle subsystem is connected to a shared vehicle-wide communications medium 2520. The smart charging module is configured to provide messages to a vehicle subsystem 2530.

Communication Services to Vehicle Subsystems

Modern electric vehicles benefit in a variety of ways from a centrally controlled smart charging program. However, the modules in the vehicle that are capable of executing a charge management program, e.g. the Battery Management Systems Charge Controller, do not generally have the ability to communicate with external networks which are outside the vehicle. To work effectively, a smart charging program requires the central control of an outside entity via an external network, such as a server. This server is responsible for coordinating the charging activities of a large number of vehicles distributed over a wide area, such as a city.

Establishing a communications channel between appropriate vehicle subsystems and external networks facilitates smart charging and reduce the cost of ownership of the vehicle. While most vehicle subsystems lack off-vehicle communication, virtually all subsystems are connected to a shared vehicle-wide communications medium or bus. In many vehicles, this bus uses the CAN-bus standard, as defined by the International Standards Organization (ISO) standard #11898. Over time, some new vehicle designs will transition to other vehicle-wide communications mediums, such as Flexray or other similar technologies. However, the basic principle of a shared communications medium to allow vehicle subsystems to communicate will remain intact, and the concepts in the present disclosure will be similarly applicable to these future communications mediums.

Rather than adding off-vehicle communications capabilities to existing vehicle subsystems, a separate module provides communication services to all subsystems on a vehicle, making these services available via the vehicle's CAN-bus. Confining the modification to a single module reduces the cost of switching communications standards such that support can be accomplished by installing different communications modules in different cars.

Such a communications module includes the hardware necessary to communicate off-vehicle, and also connects to the vehicle's CAN-bus. Software within the communications module translates or encapsulates packets to allow information to flow between the various vehicle subsystems and the entities outside the vehicle.

In one embodiment, the communications module can forward messages from the external network, unmodified, to other vehicle subsystems. As an example, if the external network uses the TCP/IP protocol, the communications module forwards TCP packets over the CAN-bus to other vehicle subsystems. Because vehicle communication busses such as CAN-bus do not natively support wide-area protocols such as TCP/IP, an encapsulation protocol is required.

Encapsulation works by defining a specific CAN message for TCP transport. Such a CAN message includes a packet header and a packet body. The packet header can specify the packet type to differentiate it from other types of CAN traffic. The packet header can also specify the packet length, and may contain other CAN packet attributes, such as addressing. The packet body includes the bytes of the original external network packet, such as a TCP packet.

Such a packet can be transmitted over the CAN-bus from the communications module to the vehicle subsystem wishing to communicate. When the vehicle subsystem wishing to communicate receives such a packet, the subsystem uses the type and size information present in the CAN packet to extract the original TCP packet. When communicating in the reverse direction, i.e. from the vehicle subsystem to the external network, the process is reversed. The vehicle subsystem places a TCP packet within a properly formatted CAN packet and transmits it over the CAN-bus to the communications module. The communications module extracts the TCP packet and transmits it over the external network.

In an embodiment, the communications module entirely decodes messages received from the external network, and re-encodes the messages as CAN-bus messages. As such, the communications module extracts the actual intended purpose of the remote message, and transmits a new message across the vehicle's CAN-bus.

As an example, the communications module may receive a packet across the external bus with the command specifying the current price of electricity. The communications module transmits a CAN-bus message to the appropriate subsystems indicating the current price of electricity. Since the communications module is fully and completely decoding and encoding each message in each direction, it is not necessary for the external network messages and the vehicle-internal CAN-bus messages to be similar in any way.

A communications module can include the following components: a central processing unit (CPU) with sufficient power to run the appropriate software; a CAN transceiver, or transceiver for an alternate in-vehicle communications network; an external communications transceiver for one or more external communications networks; a software stack capable of wrapping high level communications packets in a CAN header, for packets entering the vehicle, and removing a can header, for packets leaving the vehicle; software capable translating messages from a remote network format to the local CAN format; and, software capable of the bonding/provisioning process required by the specific external communications protocol.

Figure 26:
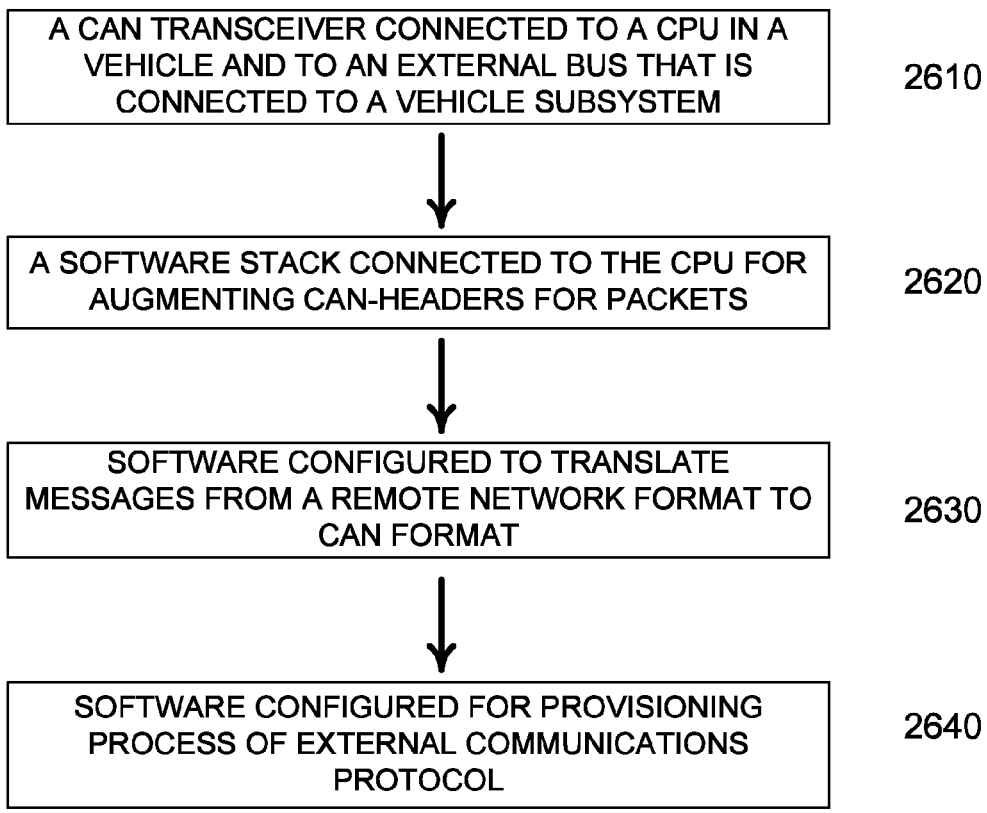
FIG. 26 is a diagram of an example of communication services to vehicle subsystems.

FIG. 26 illustrates an embodiment of communication services to vehicle subsystems. A CAN transceiver is connected to a CPU in a vehicle and to an external bus, which is connected to a vehicle subsystem 2610. A software stack is connected to the CPU for augmenting CAN headers for packets 2620. Software is configured to translate messages from a remote network format to a CAN format 2630. Software is also configured for a provisioning process of external communications protocol 2640.

Vehicle Power Systems Control Extensibility System

Electric and plug-in hybrid electric vehicles benefit greatly from on-board charge-management controllers. Such controllers can harmonize a vehicle's electricity consumption with the needs of the power grid. However, price-sensitivity time-to-market concerns, or a lack of standardization, can preclude the factory installation of these charge management controllers.

It is desirable that vehicles without factory-equipped charge controllers have the capacity to be upgraded with an after-market controller. A vehicle can be upgradable by providing a physical and software interface to allow the installation of a charge controller. This interface may include: a physical interface to the vehicle's CAN-bus, via an electrical contact plug; a standardization of software messages that are to be sent over the CAN-bus to control charging; and, a physical location for the charge controller to reside, where the CAN interface plug must be located.

Vehicles may be sold without the ability to communicate with off-vehicle networks or systems, and therefore without the ability to coordinate their charging behavior with a central authority or server. A vehicle manufacturer that recognizes the benefit of charge management may opt to not include charge management, due to reasons such as price sensitivity, time-to-market concerns, or a lack of standardization. In these situations, it is beneficial for vehicles to be easily upgradable through the installation of a communications module or charge management module. Such upgradability can be managed by clearly defining the physical, electrical and software interfaces between a communications module and the vehicle.

The mechanical interface may include a physical location for the module to be installed in the vehicle. This physical location provides access to the electrical/signaling interface, provides a particular level of environmental protection, and accommodate a particular size and shape of add-on modules.

The electrical/signaling interface may include a standardized connector to the vehicle's standardized internal communications bus, such as CAN-bus, and a standardized connector to an electrical supply. In some vehicles, the vehicle's communications bus can be a non-electrical standard, such as a Fiber-optic based system. While such a system may not be compatible with electrically signaled CAN based systems, the general principle of the extension interface can still apply.

The software interface defines the protocol messages by which the expansion module interfaces with existing modules in the vehicle.

In one embodiment, the other relevant modules in the vehicle are designed to communicate with the expansion module as defined elsewhere in the application. The expansion module provides a communications path to external networks which allows vehicle modules to participate in a smart charging program in a manner similar to that of a vehicle that is initially equipped with a communications module.

In an embodiment, existing modules in the vehicle have no explicit support for smart charging, and all smart charging logic is contained in the expansion module. As such, the expansion module is solely responsible for participating in the smart charging program. The expansion module implements the program by sending primitive messages to other subsystems in the vehicle.

Figure 27:
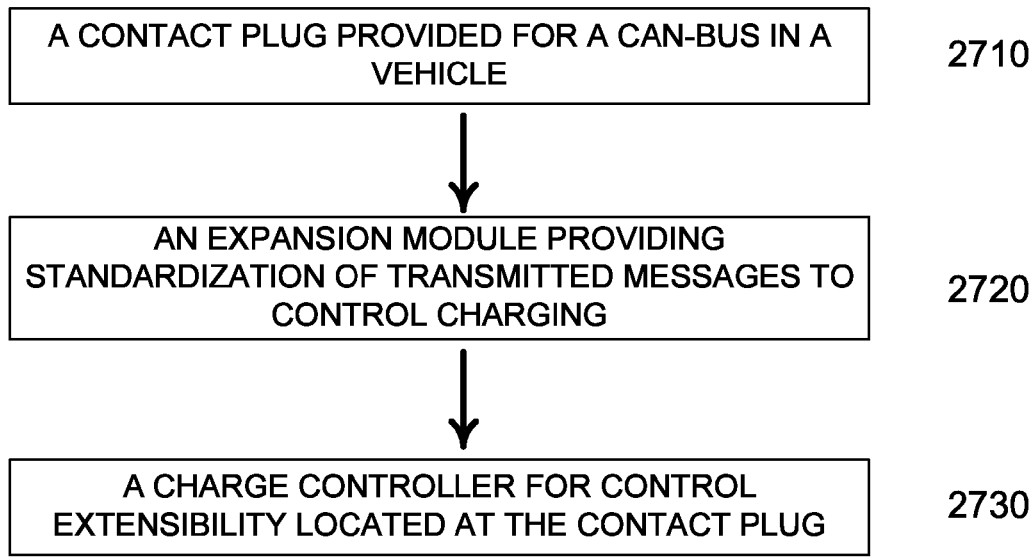
FIG. 27 is a diagram of an example of an extensibility system.

FIG. 27 illustrates an embodiment of an extensibility system including a contact plug for a CAN-bus in a vehicle 2710. An expansion module provides standardization of transmitted messages to control charging 2720. In addition, a charge controller for control extensibility is located at the contact plug 2730.

Communications without Specific Hardware

In many applications, it is beneficial for an electrical load, such as an electric vehicle, to communicate with an electric power supply, such as a charging station or an electric vehicle service equipment. Such communication can convey information such as device identification, state of battery charge, or power consumption preferences. This communication can also be utilized to implement the arbitration protocol described herein. The communication is desirable even in situations where the two devices in question do not possess hardware designed to facilitate communication.

For devices to communicate without specific communications hardware, information can be conveyed by modulating the power transfer between the electrical load (e.g. an electric vehicle) and the electric power supply (electric vehicle service equipment). To facilitate the transmission of information from the electrical load to the electric power supply, an electric load device can intermittently draw power and/or refrain from drawing power. Communications time may be subdivided into seconds. For example, each second wherein the load device drew power is interrupted as the binary 1 digit, and each second wherein the load device did not draw power is interrupted as the binary 0 digit. In a similar manner, the power supply device can communicate with the load device to facilitate the transmission of information from the electric power supply to the electric load device. The electric power supply can provide power for an interval, represented as the binary 1 digit, or refraining from providing power, represent as the binary 0 digit.

A variety of standard communication protocol techniques may be used to address issues such as data reliability and clock drift. Depending on the accuracy of both sensing equipment in the receiving device and switching equipment in the transmitting device, the time interval can be varied. For example, the time interval may be varied to an interval much lower than one second. Lower intervals would allow a greater amount of information to be transmitted in the same amount of time.

Because the non-powered intervals deprive the load device of electrical power, the load device requires a supplemental power source to remain functional during such intervals. This supplemental power source can be a storage battery, a capacitor, or an alternative primary electrical source. This system does not interfere with the primary function of the power circuit, which is power transfer, because all communication may be completed early in the power connection and power can flow uninterrupted for the remainder of the connection time.

To address the limitation of communications mediums that prohibit both the electric vehicle and the electric power source from transmitting information simultaneously, a variety of sharing protocols can be used. In one embodiment, the electric power supply and the electric vehicle take turns transmitting information, reversing roles after a fixed number of bits. In an embodiment, the transmitted messages are structured as packets with a transmitted size. After the transmission of a packet, the direction of transmission is reversed.

Figure 28:
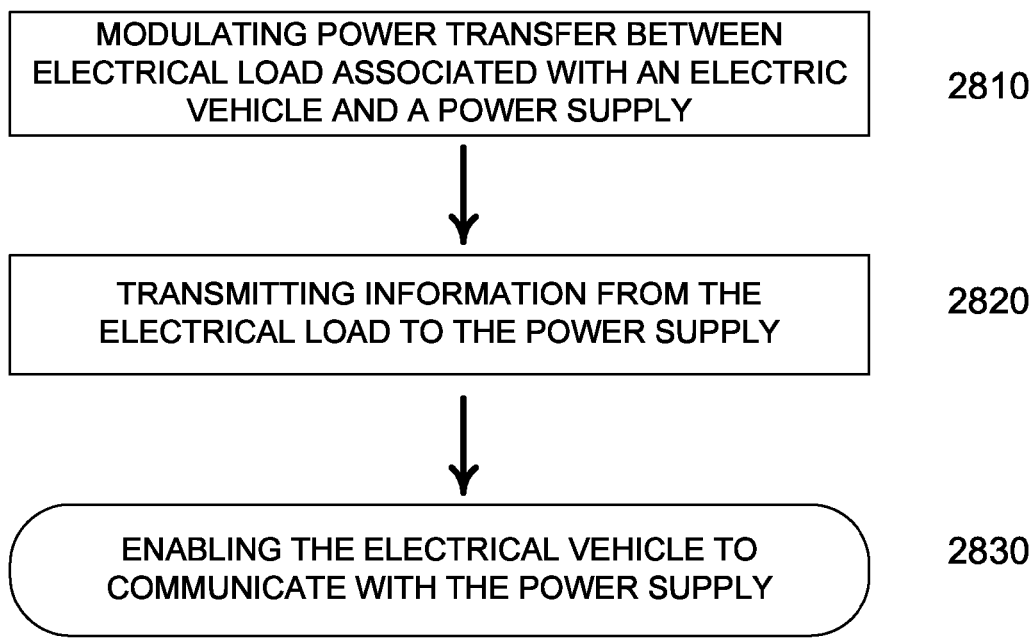
FIG. 28 is a diagram of an example of communications without specific hardware.

FIG. 28 illustrates an embodiment of communications without specific hardware including modulating power transfer between an electrical load associated with an electric vehicle and a power supply 2810, transmitting information from the electrical load to the power supply 2820, and enabling the electrical vehicle to communicate with the power supply 2830.

Arbitrating Smart Chargepoint with Smart Vehicle

Modern Electric vehicles could benefit in a variety of ways from a centrally controlled smart charging program where a central server coordinates the charging activities of a large number of vehicles distributed over a wide area, such as a city. This coordination is accomplished by the server communicating directly with a smart charging module located at each vehicle. The smart charging module can be located inside the vehicle, either as an original component of the vehicle or an aftermarket accessory. Equipment located inside the vehicle can moderate electrical load by directly reducing the power consumption of the vehicle.

In one embodiment, the smart charging module will be located in external equipment responsible for providing electricity to the vehicle. Such external equipment may be electric vehicle service equipment (EVSE). EVSE or charging stations can reduce power consumption by curtailing the power available to the vehicle.

In the case where both the electric vehicle and the EVSE contain smart charging modules, a potential problem arises. Because charge management systems can be integrated into both vehicles and vehicle charging infrastructure, each of these systems may initially assume that they are the only charging intelligence present in a charging session. When a smart car attaches to a smart chargepoint, certain problems arise. Because the two devices are not communicating with each other, the devices each act as if they have full control of the charge session. If the central smart charging server is not informed that the two devices represent a single vehicle, it will manage the two devices independently. The two devices may attempt to charge at different times, resulting in no power flow. Furthermore, both devices may receive stop charging messages from a utility at the same time, resulting in double-counting of load reduction.

To address these concerns, electric vehicles and charging equipment, or EVSE, can both implement a charge coordination protocol. This protocol allows the EVSE and the vehicle to determine which of the two entities is responsible for communicating with the charge management server and implementing a smart charging program. The other entity would enter a passive mode, following the direction of the primary entity.

With such a protocol, an electric vehicle can transmit a charge coordination capabilities message to the chargepoint when the vehicle is connected. The capabilities message specifies charge coordination modes that the vehicle supports. The charge equipment can send a charge coordination mode message specifying the coordination mode. This mode may be selected from the list provided by the vehicle. When the two messages have been transmitted, the charge equipment and vehicle commence coordinated charging.

Two coordinated charging modes are initially defined as charge-equipment switching charging and vehicle-switching charging. In the charge-equipment switched charging mode, the electric vehicle stops smart charging and behaves as a dumb load. The EVSE, or the charge equipment, sends electricity as it determines while the vehicle does not communicate with any external entity for purposes of charge management. As such, the EVSE controls the rate of electricity flow to the vehicle and is responsible for all communication with smart charging server.

In the vehicle-switched charging mode, the EVSE or charging equipment does not engage in smart charging and provide electricity on-demand to the Vehicle at all times. The electric vehicle controls its rate of electricity consumption and is responsible for all communication with the smart charging server. The electric vehicle performs the physical regulation of charge level. However, the regulation of charging is based on commands issued by the charging equipment.

If the vehicle possessed an alternative communications channel, such as cellular, the vehicle stops accepting charge commands from that channel. Charging equipment may monitor the vehicle to determine whether the vehicle had complied with charge directives. The vehicle can fall back to direct control if it is determined that the vehicle was non-compliant.

Additional charging modes may be defined over time. Communication between the electric vehicle and the EVSE could be accomplished via Power Line Communications (PLC) over the charging cable, or via other means, including wireless communications.

Figure 29:
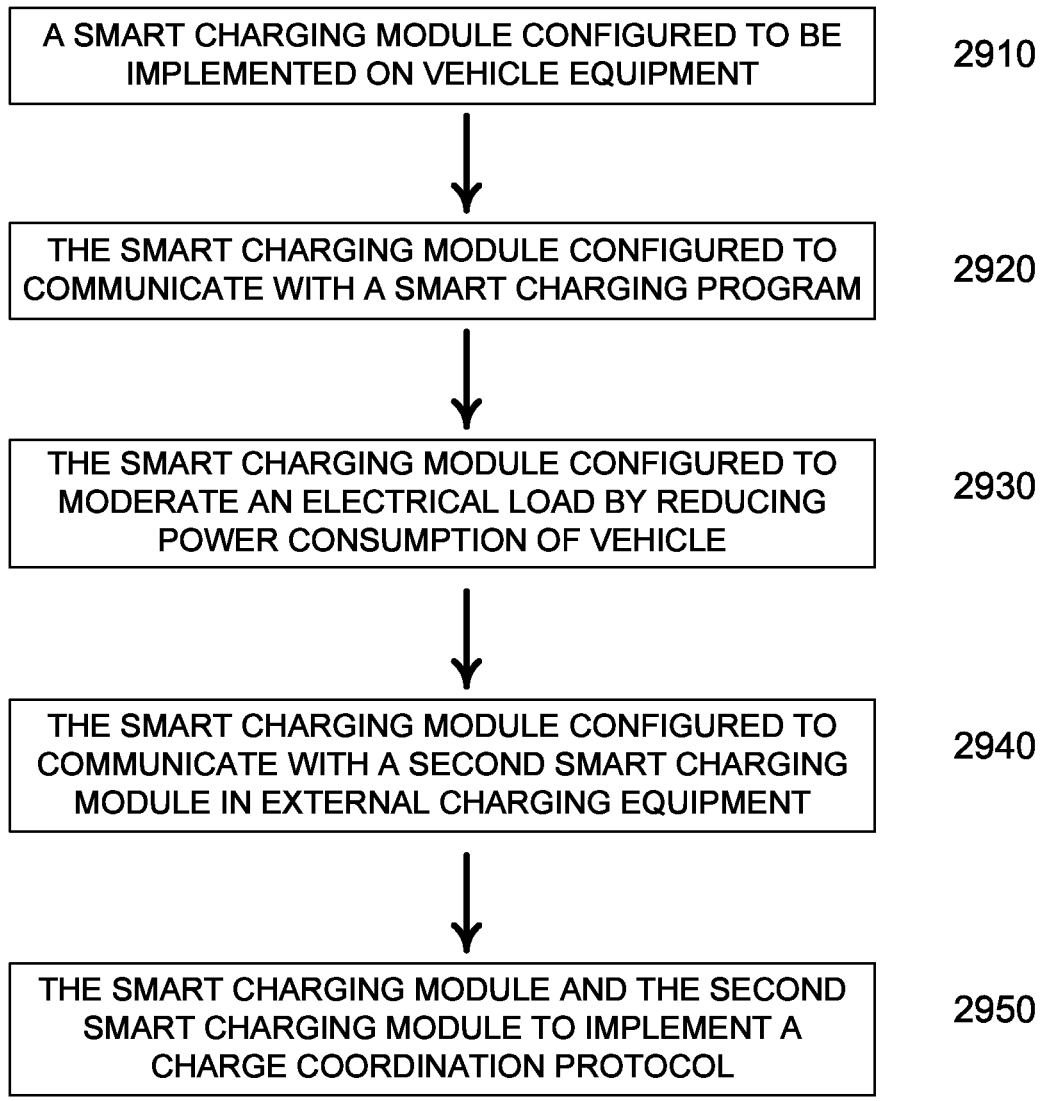
FIG. 29 is a diagram of an example of arbitrating a smart chargepoint.

FIG. 29 illustrates an embodiment of arbitrating a smart chargepoint with a smart charging module configured to be implemented on vehicle equipment 2910. The module is configured to communicate with the smart charging program 2920, and to moderate an electric load by reducing power consumption of the vehicle 2930. In addition, the module is configured to communicate with a second smart charging module in external charging equipment 2940, and the modules implement a charge coordination protocol 2950.

CONCLUSION

Although systems and methods have been described in language specific to structural features and/or methodological acts, it is to be understood that the subject matter defined in the appended claims is not necessarily limited to the specific features or acts described. Rather, the specific features and acts are disclosed as examples of implementations of the claimed methods, devices, systems, etc. It will be understood by those skilled in the art that various changes in form and details may be made therein without departing from the spirit and scope of the invention.

What is claimed is:

1. A method for determining the location of devices on power flow management system using network fingerprints, comprising:
    receiving network information, wherein the network information is associated with a plurality of electric devices;
    generating a network fingerprint based on the network information;
    storing the network fingerprint in a database;
    detecting a change in device information of at least one of the plurality of electric devices;
    comparing the changed device information of the at least one of the plurality of electric devices with the network fingerprint; and
    determining a location of the at least one of the plurality of electric devices based on the network fingerprint.

2. The method of claim 1, wherein the network information is received by a power flow management system.

3. The method of claim 1, wherein the network information is received by at least one of the plurality of electric devices.

4. The method of claim 1, wherein the database is stored by a power flow management system.

5. The method of claim 1, wherein the database is stored by at least one of the plurality of electric devices.

6. The method of claim 1, wherein the network fingerprint is generated using an approach selected from a group consisting of Global Positioning System (GPS) or cellular tower based Location Based Services (LBS).

7. The method of claim 1, wherein the device information of the at least one of the plurality of electric devices is information selected from a group consisting of a MAC addresses, IP addresses, or trace routes.

8. The method of claim 1, wherein the changed device information and the network fingerprint is compared using pattern matching.

9. The method of claim 1, wherein the location of the at least one of the plurality of electric devices is a network reference.

10. The method of claim 1, further comprising assigning a random location identifier.

* * * * *